(12) United States Patent
Pinto et al.

(10) Patent No.: US 12,348,605 B1
(45) Date of Patent: Jul. 1, 2025

(54) METHOD AND SYSTEM FOR TIME-ALIGNED MEDIA PLAYBACK

(71) Applicant: Apple Inc., Cupertino, CA (US)

(72) Inventors: Stephen E. Pinto, Mountain View, CA (US); Yasser Rihan, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/419,360

(22) Filed: Jan. 22, 2024

Related U.S. Application Data

(60) Division of application No. 17/530,306, filed on Nov. 18, 2021, now Pat. No. 11,924,317, which is a continuation-in-part of application No. 17/478,712, filed on Sep. 17, 2021.

(60) Provisional application No. 63/083,784, filed on Sep. 25, 2020.

(51) Int. Cl.
 *H04L 7/04* (2006.01)
 *G06F 3/16* (2006.01)
 *H04L 7/00* (2006.01)

(52) U.S. Cl.
 CPC .......... *H04L 7/0008* (2013.01); *G06F 3/165* (2013.01); *H04L 7/00* (2013.01)

(58) Field of Classification Search
 CPC ........ H04L 7/0008; H04L 7/00; H04L 65/65; G06F 3/165; H04N 7/18
 USPC ........................................ 375/365, 354, 362
 See application file for complete search history.

(56) References Cited

U.S. PATENT DOCUMENTS

| | | |
|---|---|---|
| 7,765,315 B2 | 7/2010 | Batson et al. |
| 8,694,670 B2 | 4/2014 | Batson et al. |
| 8,762,580 B2 | 6/2014 | Rajapakse |
| 9,300,713 B2 | 3/2016 | Wang et al. |
| 9,979,998 B1 | 5/2018 | Pogue et al. |
| 10,237,008 B2 | 3/2019 | Butterworth et al. |
| 10,313,041 B2 | 6/2019 | Butterworth et al. |
| 11,924,317 B1 | 3/2024 | Pinto et al. |

(Continued)

FOREIGN PATENT DOCUMENTS

| | | |
|---|---|---|
| EP | 1758308 A1 | 2/2007 |
| WO | 2016207428 A1 | 12/2016 |

OTHER PUBLICATIONS https://developer.apple.com/videos/play/wwdc2019/603/— Introducing Realitykit and Reality Composer, 2019.

(Continued)

*Primary Examiner* — Phuong Phu
(74) *Attorney, Agent, or Firm* — Aikin & Gallant, LLP

(57) ABSTRACT

A method performed by a first electronic device. The method generates, at the first electronic device that is sharing a global clock with a second electronic device, a first timebase information that includes a first timebase that defines a relationship between the shared clock and an internal clock of the first electronic device, the first timebase information for synchronizing playback of a first piece of media content associated with a first application between the first and second electronic devices. The method receives, from a second application, a second timebase information that includes a second timebase that defines a relationship between the first timebase and a second piece of media content, generates a third timebase information that includes the first timebase and the second timebase, and transmits the third timebase information to the second electronic device.

20 Claims, 11 Drawing Sheets

(56) References Cited

U.S. PATENT DOCUMENTS

| | | |
|---|---|---|
| 2006/0280182 A1 | 12/2006 | Williams et al. |
| 2008/0168470 A1 | 7/2008 | Bushell et al. |
| 2008/0174662 A1* | 7/2008 | Choi ........................ H04N 7/18 375/240.01 |
| 2012/0219099 A1 | 8/2012 | Loukianov |
| 2013/0117597 A1 | 5/2013 | Batson et al. |
| 2015/0049248 A1* | 2/2015 | Wang ...................... H04L 65/65 370/389 |
| 2017/0180803 A1 | 6/2017 | Lee et al. |
| 2018/0196393 A1 | 7/2018 | Oda et al. |
| 2018/0350374 A1 | 12/2018 | Butterworth et al. |
| 2019/0324713 A1 | 10/2019 | Millington |
| 2021/0104211 A1 | 4/2021 | John et al. |
| 2021/0243716 A1 | 8/2021 | Ma et al. |
| 2021/0405962 A1 | 12/2021 | Mackay et al. |
| 2021/0409138 A1 | 12/2021 | Galuten |
| 2022/0030214 A1 | 1/2022 | Sinharoy et al. |
| 2023/0103012 A1 | 3/2023 | Zinner |
| 2023/0214025 A1 | 7/2023 | Lessman et al. |

OTHER PUBLICATIONS https://developer.apple.com/documentation/realitykit/synchronizationservice—Apple's Realitykit Synchroniztion Service, 2019.

* cited by examiner

METHOD AND SYSTEM FOR TIME-ALIGNED MEDIA PLAYBACK

CROSS-REFERENCE TO RELATED APPLICATIONS

This application is a divisional of co-pending U.S. application Ser. No. 17/530,306 filed Nov. 18, 2021, which is a continuation-in-part of U.S. application Ser. No. 17/478,712 filed Sep. 17, 2021, which claims the benefit of and priority to U.S. Provisional Patent Application No. 63/083,784, filed Sep. 25, 2020, which are hereby incorporated by this reference in their entirety.

FIELD

An aspect of the disclosure relates to aligning media (e.g., audio and/or video) playback on several devices. Other aspects are also described.

BACKGROUND

In recent years, extended reality (XR) systems have become more ubiquitous in different industries, such as gaming and entertainment because of advancements in computer technology. Specifically, advancements in hardware and in software provide users with a more seamless and realistic experience within virtual worlds. In addition, with the proliferation of mobile devices (e.g., smartphones) and the creation of do-it-yourself stereoscopic viewers, users are no longer tied to a stand-alone XR system. Instead, users may simply attach the smartphone to the viewer and immediately engage in a virtual world.

SUMMARY

An aspect of the disclosure is a method performed by a first electronic device of a system that aligns media playback between one or more devices. The device shares a global clock with a second electronic device, and generates a first timebase information (e.g., timing data) that includes a first timebase that defines a relationship between the shared clock and an internal clock of the first device, the first timebase information for synchronizing playback of a first piece of media content (e.g., audio content, video content, etc.) associated with a first application between the devices. The first device receives, from a second application, a second timebase information that includes a second timebase that defines a relationship between the first timebase and a second piece of media content. The first device generates a third timebase information that includes the first and second timebases, and transmits the third timebase information to the second device.

In one aspect, the second timebase information is received via an application programming interface (API) through which the second application communicates with the first application. In some aspects, the second timebase information is received via a communication data link that is established between the first electronic device and a third electronic device that is executing the second application, according to the API. In another aspect, the second application is a third-party application created by a third-party developer (e.g., with respect to a developer or vendor of the first application).

In one aspect, the first piece of media content comprises audio content of the first application, wherein the second piece of media content comprises video content that is associated with the audio content, wherein the method further comprises using the third timebase information to synchronize playback of the audio content with the video content. In some aspects, the second timebase information further includes a third timebase defines a relationship between the first timebase and a performance of one or more logical functions by the second application. In another aspect, the second piece of media content comprises audio content of the second application, wherein the method further comprises using the third timebase information to synchronize playback of the audio content with the performance of the one or more logical functions by the second application.

According to another aspect of the disclosure, a non-transitory machine readable medium (e.g., of the first device) having instructions which when executed by a processor of the first electronic device generate, at the first electronic that is sharing the global clock with the second electronic device, the first timebase information that includes the first timebase that defines a relationship between the shared clock and an internal clock of the first electronic device, the first timebase information for synchronizing playback of a first piece of audio content of a first application between the first and second electronic device; receive input from an audio processing routine of a second application, the input comprises a second timebase that defines a relationship between the first timebase and a second piece of audio content; in response, transmit the output to the second electronic device, the output comprises a second timebase information that includes the first and second timebases.

In one aspect, the input comprises a playback state of the second piece of audio content and data that defines the relationship between the first timebase and the playback state of the second piece of audio content. In another aspect, the data indicates a time at which the second piece of audio content is to be played back with respect to time associated with the first timebase and a playback rate. In some aspects, the instructions to return output comprises instructions to add the second timebase to the first timebase information to produce the second timebase information.

According to another aspect of the disclosure, a method includes receiving, from an application that is being executed on a first electronic device, timebase information that includes a first timebase that defines a relationship between a playback state of audio content of the application and an internal clock of the first electronic device or another timebase; receiving metadata that indicates a logical function; generating a second timebase that defines a relationship between the first timebase a performance of the logical function based on the metadata; and providing the second timebase to the application.

In one aspect, the performance of the logical function comprises displaying an image or animation, wherein the second timebase is configured to synchronize the playback state of the audio content with the displaying of the image or animation. In another aspect, the application is a first application, wherein the metadata is associated with a second application that is configured to perform the logical function, wherein the second timebase is provided, by the second application, to the first application that is being executed on the first electronic device via an application programming interface (API). In some aspects, providing the second timebase comprises establishing, by the second application that is being executed on a third electronic device, a communication data link via the API; and transmitting, over the communication data link, the second timebase to the first electronic device.

In one aspect, the method is performed by a third-party application with respect to the application that is being executed by the first electronic device. In another aspect, the second timebase synchronizes the playback state of the audio content with the performance of the logical function on the first device and a second electronic device, wherein the method further includes, after providing the second timebase, adjusting the relationship between the first timebase and the performance of the logical function; and providing the second timebase with the adjusted relationship to the application to resynchronize the playback state of the audio content with the performance of the logical function on the first and second electronic devices. In another aspect, the method further includes determining an alignment to perform the logical function with respect to the playback state of the audio content to synchronize the performance of the logical function with the audio content during playback by the first device and a second device, wherein the second timebase is generated based on the determined alignment.

According to another aspect of the disclosure, a non-transitory machine-readable storage medium comprising instructions stored therein that configure an electronic device to: present an application programming interface (API), wherein the API comprises a first timebase that defines a relationship between a piece of audio content and an internal clock of the electronic device or a second timebase, wherein the first timebase comprises a playback time of the piece of audio content with respect to the internal clock or the second timebase; receive, via the API, an adjustment to the playback time of the first timebase; and adjust the playback time of the first timebase according to the received adjustment, such that the piece of audio content is to be played back by the electronic device according to the adjusted playback time.

In one aspect, the first and second timebases are a part of a timebase tree, wherein the memory has further instructions to receive a new timebase that defines a relationship between a playback state of the piece of video content and the first timebase; and adding the new timebase to the timebase tree. In some aspects, the instructions to receive the new timebase comprises instructions to receive, via the API, one or more parameters that define the relationship; and creating the new timebase based on the one or more parameters. In one aspect, the one or more parameters comprises a rate at which the piece of video content is to be played back, an anchor time of the first timebase, and an anchor time of the new timebase.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1A:
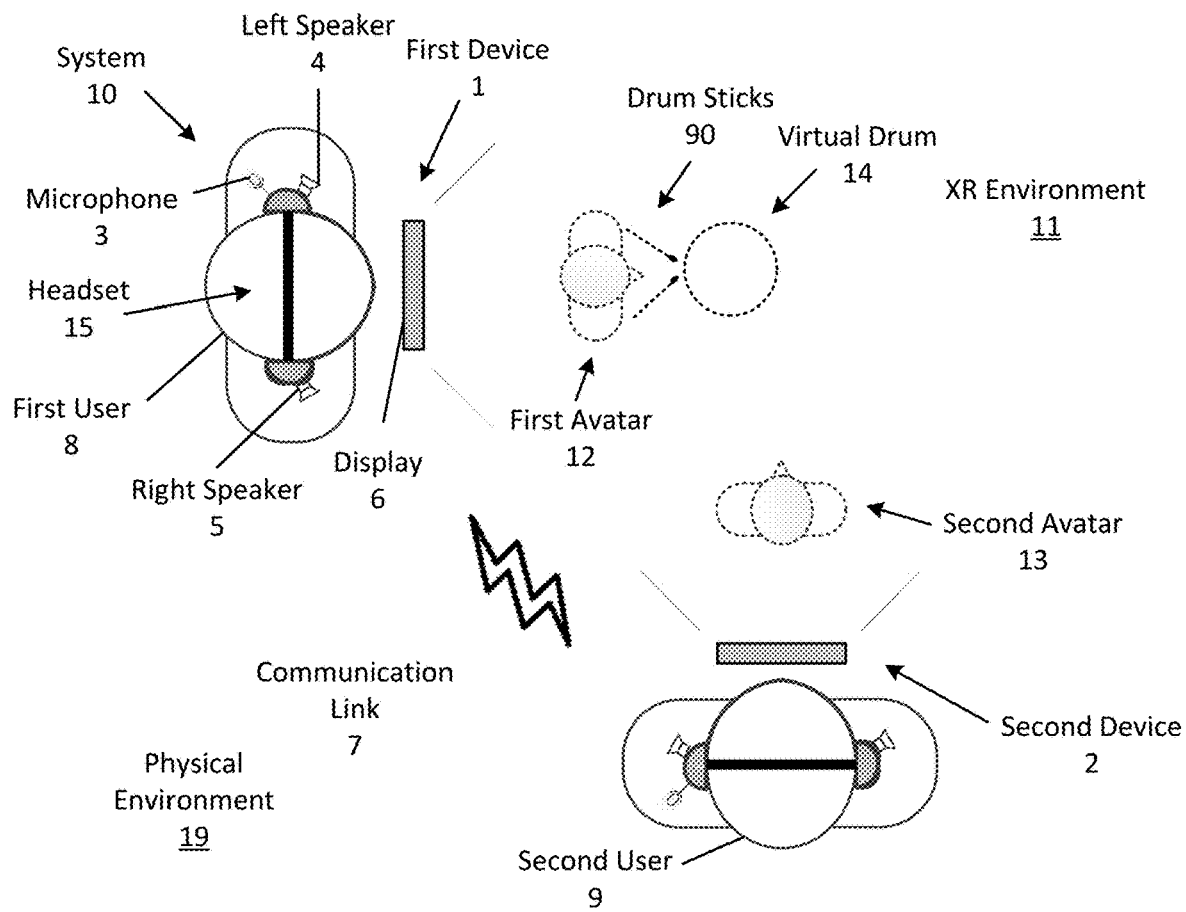
FIGS. 1A and 1B shows a system with first and second electronic devices that perform time-aligned media playback operations according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

A physical environment (or setting) refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment (setting) refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems (or head mounted devices (HMDs)), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The entertainment industry provides users with audio/video experiences through many types of content, such as movies, musical compositions, etc. In addition, entertainment providers may provide interactive experiences (e.g., where users may interact with one another) within virtual worlds, which may be constructed in computer games that are executing on the user devices and/or other remote devices (e.g., remote electronic servers). These virtual experiences are not only visual, but also audible, having users hear sounds from (or as if emerging from within) the virtual environment. Sometimes multiple users may participate within the same virtual world and interact with one another, such as when (e.g., two) users participate, via separate electronic devices, in a virtual environment within a computer game. For instance, a virtual environment may be displayed on each electronic device's display and sounds from within the environment, such as ambient virtual sounds, sounds produced by virtual objects, such as a telephone ringing, etc., may be played back via each electronic device's speaker(s). Synchronized audio playback between electronic devices is essential in order to provide the best user experience. For example, if users were in the same physical room and sound playback of a virtual door closing is not synchronized between both devices, each user may hear cross-talk from the other's speakers. This crosstalk may diminish spatial perception of audio playback heard by each user, which may lead to a poor user-experience. Thus, it is important that audio playback between participants' devices is time-aligned so that playback is synchronized (e.g., such that virtual sounds are experienced by each user at the same time).

Conventional methods for time alignment for media playback between electronic devices involve a "best effort" approach. For example, when the user of one device closes the virtual door (e.g., based on user-input), the device transmits a message to another device containing data indicating that the door has been (or is being) closed and that the sound of a door closing is to be played back through the other device. Once the other device receives the message, the device immediately visually and audibly presents the door closing. This method, however, is subject to latencies (e.g., to a computer network of which both devices are communicatively coupled). As a result, although the other device may playback the sound immediately (e.g., once the message is received), the playback time of one device may be later (or before) playback time of the other. Thus, both devices may not playback the sound at the same time, resulting in cross talk as previously described. Therefore, there is a need for an audio system that provides time-aligned media (e.g., audio and/or video) playback.

Figure 1B:
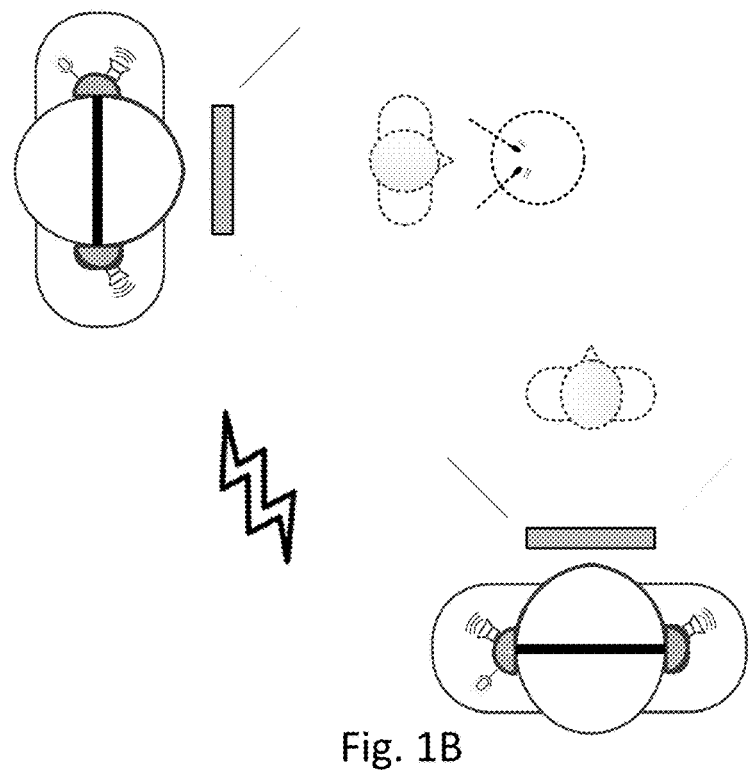

FIGS. 1A and 1B shows a system with first and second electronic devices that perform time-aligned media playback operations according to one aspect. In one aspect, the term "media" may include any type of audio and/or image (video) data (content) that may be played back (e.g., presented) by an electronic device. For example, media may include sounds (e.g., audio content) that may be played back (e.g., via one or more speakers) of an electronic device. As another example, the media may include video (or animations) which may be presented (or displayed) on one or more display screens of the electronic device. In another aspect, media may include other types of data (or metadata) associated with one or more software applications. More about the types of media is described herein.

As shown, each figure illustrates a system 10 that includes a first electronic (audio) device (or first device) 1 that is positioned in front of a first user 8 and a second electronic (audio) device (or second device) 2 that is positioned in front of a second user 9 within a physical environment 19. Each figure also illustrates a XR environment 11 in which both of the users are participating via their respective devices. More about the XR environment is described herein.

In this figure, both of the electronic devices 1 and 2 may each include one or more displays (display screens) 6 that are configured to display image data and/or video data (or signals) to each respective user. In this example, both devices are displaying image data that represents at least one scene within the XR environment 11. Specifically, each of the electronic devices may be a handheld device, such as a tablet computer, smart phone, etc. In this case, each user is holding their respective device in front of one or both of their eye's such that they may view the device's display screen. In one aspect, each device may be any portable electronic device, such as a smart phone, laptop computer, etc. In another aspect, the electronic devices may be arranged to be received by a head-worn device (HWD), such that when received the electronic devices may display a three-dimensional (3D) visual representation of the XR environment 11. In some aspects, at least one of the electronic devices may be a head-worn device, such as smart glasses.

Each user is also shown as wearing a headset 15, which is arranged to be worn on the head of the user. The headset includes a (or at least one) microphone 3, at least one left speaker 4, and at least one right speaker 5. The microphone 3 that may be any type of microphone (e.g., a differential pressure gradient micro-electro-mechanical system (MEMS) microphone) that is arranged to convert acoustical energy caused by sound waves propagating in an acoustic (e.g., physical) environment into a microphone signal. Each of the speakers is configured to playback audio (e.g., sounds of the XR environment 11). Each speaker may be an electrodynamic driver that may be specifically designed for sound output at certain frequency bands, such as a woofer, tweeter, or midrange driver, for example. In one aspect, at least one of the speakers may be a "full-range" (or "full-band") electrodynamic driver that reproduces as much of an audible frequency range as possible.

In one aspect, each of the speakers 4 and 5 of the first device are "extra-aural" speakers that are positioned on (or integrated into) a housing of the device and arranged to project (or output) sound directly into the physical environment 19. In one aspect, the headset(s) may be arranged to allow sound from the ambient environment and/or sound produced by one or more extra-aural speakers (e.g., speakers of headset 15 and/or the headset being worn by the second user 9) to be heard by the user 8. Specifically, the headset may be designed to allow sound to pass through the ear cups of the headset and enter the user's ear. For example, the headset may be open-back headphones that (e.g., have one or more openings that) allow sound from the ambient environment to pass through (e.g., a housing or ear cup of) the headset into the user's ear.

Figure 2:
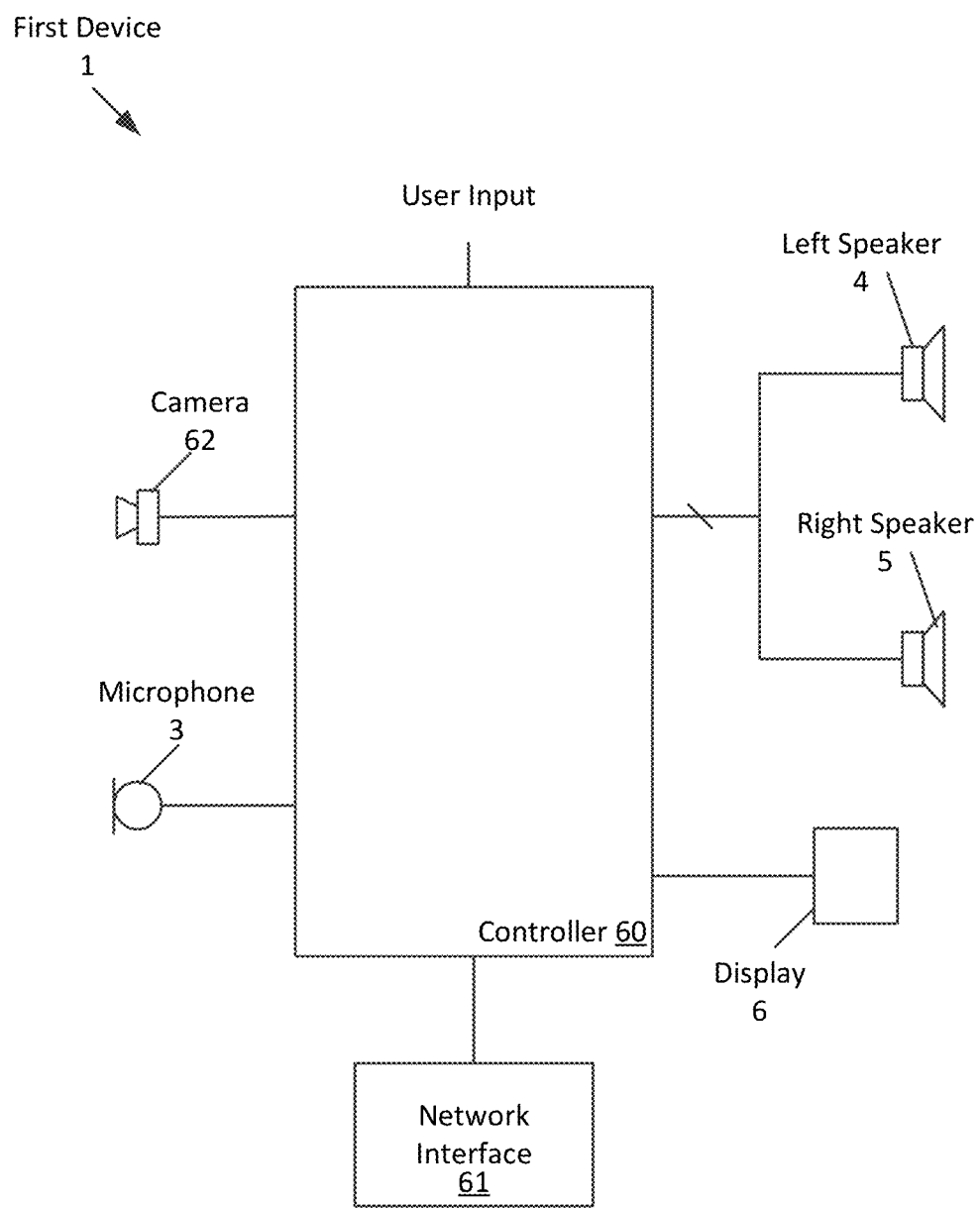
FIG. 2 shows a block diagram illustrating the first electronic device according to one aspect of the disclosure.

In another aspect, the headset may perform one or more audio signal processing operations to allow ambient sound to be heard by the user. In which case, one or more of the speakers 4 and 5 may be "internal" speakers, which, in contrast to extra-aural speakers, are arranged to project sound (e.g., directly) into or towards a user's ears. In which case, the speakers may be inside (and integrated into) a housing of the headset may be pointed towards the user's ear, such that front-radiating sound produced by the speaker is directed towards the user's ear (canal). For example, an in-ear headphone (or earbud) may include an internal speaker, which when the in-ear headphone is inserted into a user's ear, the internal speaker projects sound into the user's ear canal. In one aspect, the headset 15 may perform a transparency function in which sound played back by the one or more internal speakers the device is a reproduction of the ambient sound that is captured by the device's microphone in a "transparent" manner, e.g., as if the output device was not being worn by the user. The (e.g., controller, as illustrated in FIG. 2 of the) headset may process at least one microphone signal captured by the microphone 3 and filters the signal through a transparency filter, which may reduce acoustic occlusion due the device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the output device may determine the transparency filter according to a head-related transfer function (HRTF) or, equivalently, head-related impulse response (HRIR) that is based on the user's anthropometrics. Thus, sound produced by the headset 15 and/or the speaker(s) 4 and/or 5 may be heard by the user via at least a portion of the headset.

As shown, the headset 15 is an over-the-ear headset (or headphones) that at least partially covers both of the user's ears. The left speaker 4 and the microphone 3 are coupled to a left headset housing of the headset and the right speaker 5 is coupled to a right headset housing of the headset. In one aspect, the headset may include or be coupled to multiple extra-aural speakers that form a speaker array that is configured to produce spatially selective sound output. For example, the array may produce directional beam patterns of sound that are directed towards locations within the environment, such as towards the ears of the user. In another aspect, the headset may include any number of extra-aural speakers, which may be arranged in any configuration. For instance, rather than having two speakers, one on each housing, the headset may only include one extra-aural speaker coupled to one housing. In some aspects, in addition to (or in lieu of) the extra-aural speakers, the headset may include at least one internal speaker that is arranged to direct sound into (and towards) the ears of the wearer. For instance, the left headset housing may include at least one internal speaker, and the right headset housing may include at least one internal speaker. In some aspects, the device may include both or either types of speakers.

In some aspects, the headset 15 may include any type of audio output device arranged to output sound, such as an on-the-ear headset or an in-ear headset (earphone or earbuds). In another aspect, the headset 15 may be any electronic device with a display, such as a smart phone, a tablet computer, a laptop, a desktop, or the like. In another aspect, the headset may be a hearing aid device that is configured to produce amplified ambient sounds into the ear (e.g., canal) of a user.

In one aspect, the first (and/or second) electronic device 1 may be one electronic device, which includes at least some of the components described herein. As described herein, the headset 15 is separate from the first electronic device 1 In this case, both devices may be communicatively coupled to one another, via a wireless connection (e.g., BLUETOOTH connection), such that both devices may exchange (e.g., audio) data between one another. For example, when presenting the image data (e.g., video data of the XR environment), the first device 1 may transmit audio data (one or more audio signals) associated with the image data to the headset 15 in order to output the audio data through the left and right speakers. More about exchanging audio data is described herein. In another aspect, both devices may be integrated with one another. For example, the first device 1 may include at least some of the components of the headset 15, such as the microphone 3, left speaker 4, and right speaker 5. In this case, the first user 1 may use the first device 1 to view image data and/or hear audio data (e.g., participate in the XR environment) without the need of a headset. In another aspect, at least some of the components described herein may be a part of two or more separate devices (e.g., that are communicatively coupled with one another, such as through a BLUETOOTH connection). For instance, each of the speakers 4 and 5 may be (a part of) standalone speakers that are communicatively coupled to the first device 1.

As shown, the second device 2 is the same type of device as the first device 1. The second user 9 is also shown to be wearing the same type of headset (e.g., headset 15), as the first user 8. In another aspect, both electronic devices may be different. For example, the second device 2 may be a HWD in which the speakers, microphone, and display are integrated into (or a part of) a single electronic device. In another aspect, the second device may include more components as the first device (e.g., having two or more microphones, etc.).

Both the first device 1 and the second device 2 are communicatively coupled to one another via a communication data link 7. In some aspects, the communication link 7 may be established over a computer network (e.g., the Internet). In one aspect, the network may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wirelessly local area network (WLAN), a cellular network, etc., in order to exchange digital (e.g., audio) data. With respect to the cellular network, the output device may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones). In another aspect, the devices may be configured to wirelessly exchange data via other networks, such as a Wireless Personal Area Network (WPAN) connection. For instance, both devices may be configured to establish a wireless connection via any wireless communication protocol (e.g., BLUETOOTH protocol or any other wireless communication protocol). During the established wireless connection, the devices may exchange (e.g., transmit and receive) data packets (e.g., Internet Protocol (IP) packets), which may include audio digital data and/or image/video data (e.g., associated with the XR environment).

In some aspects, both devices may be located in separate locations, but connected (e.g., to each other via) the Internet and via separate LANs (WLANs). In another aspect, the devices may be in the same room (or within a threshold distance). In which case, the devices may communicate via other connections, such as a WPAN connection.

Returning to FIG. 1A, this figure illustrates that the first user 8 and the second user 9 participating in a XR environment 11, through the use of their respective devices (and headsets). The XR environment includes a first avatar 12 that corresponds with the first user and a second avatar 13 that corresponds with the second user. Specifically, the devices 1 and 2 are both presenting the XR environment (via their displays) to each respective user through the perspective of their respective avatars (e.g., in a first-person perspective). In another aspect, either of the devices may present the XR environment in another perspective, such as a third-person perspective, as illustrated herein. In this figure, the first avatar is holding a pair of drum sticks 90 and is standing in front of a virtual drum 14. As shown, both headsets 15 are not, however, outputting any sound via their respective speakers (which may be the case when no sounds are occurring within the XR environment).

FIG. 1B illustrates that the first avatar 12 is playing the virtual drum 14 (e.g., based on user-input of the first user 8), and as a result both the first and second user's headsets are playing back the audio content (e.g., sounds of drums being played) in synchronization. Specifically, the first device 1 may include (and/or be communicatively coupled to) one or more user-input devices, each configured to allow the user to interact with the XR environment in response to user input. For example, the first device may receive user input via a user-input device (e.g., a controller) to interact with the virtual drum 14 within the XR environment. In this case, the user input may be an up and down hand motion, of which the user-input device tracks (e.g., using a motion sensor integrated therein). This motion data is then used by the first device 1 to perform a corresponding motion of the drum sticks 90 atop the virtual drum 14.

Once the first user 1 interacts with the XR environment 11 (e.g., by playing the virtual drum 14), the first device 1 is configured to transmit timing data to the second device 2, such that both devices playback the sound of playing drums simultaneously. Specifically, the first device is configured to perform time-aligned audio playback operations of the present disclosure. In particular, the first device is configured to signal (or transmit a signal to) the second device to share a clock. In one aspect, the first device may share an internal clock of the first device with the second device, such that both devices have separate internal clocks that are (at least partially) synchronized with one another. For example, the first device may transmit clock synchronization messages using IEEE 802.1AS protocol, thereby aligning both device's internal clocks. The first device generates a timebase hierarchical tree as timebase information (or timing data) that defines a relationship between the shared clock and one or more playback states of audio content that is to be played back within the XR environment (e.g., the sound of drums). In this case, the relationship may indicate that both devices are to playback the sound immediately, with respect to the shared clock. More about timebase hierarchical trees is described herein.

The first device transmits the timing data to the second device. Both devices playback the sound of the drums according to the same hierarchical tree (e.g., hierarchical trees that may include one or more timebases that have the same or similar relationships between clocks and/or timebases), such that the playback state of the drums is synchronized across both devices. In particular, both devices may transmit audio data to their respective headsets 15 to drive the headsets' one or more speakers. This synchronization is made possible since both devices have timebase hierarchical trees are rooted in a shared clock between the devices. As a result, both devices will playback time-aligned audio (e.g., of the XR environment), thereby reducing (or eliminating) cross-talk.

FIG. 2 shows a block diagram illustrating the first device according to one aspect of the disclosure. The device includes (or is coupled to) the microphone 3, the left speaker 4, the right speaker 5, the display 6, a controller 60, a network interface 61, and at least one camera 62. In one aspect, the first device may include more or less elements, such as having three or more speakers, one or more microphones, and one or more cameras. As described herein, each of these components may be a part of (integrated into) the first device. In one aspect, the second device 2 of FIGS. 1A and 1B may have at least some of the elements of which are included in the first device.

As described herein, the first device may be a wireless device. For example, the network interface 61 is configured to establish a wireless communication link (e.g., link 7 illustrated in FIGS. 1A and 1B) with another (wireless) device (such as the second device 2, a wireless access point, etc.) in order to exchange data over a wireless network. In another aspect, at least some of these components may be a part of a separate device, such as headset 15 shown in FIGS. 1A and 1B. In another aspect, the network interface 61 is configured to establish a wireless communication link with an audio output device, such as the headset 15. In that case, the headset may transmit sensor data, such as microphone signals captured by one or more microphone, and the first device may transmit audio data, such as audio driver signals to drive one or more speakers of the headset.

In one aspect, at least some of the elements of device 1 described herein (e.g., the camera 62) may be a part of a different electronic device within the system 10, or may be a standalone device that communicates with the (controller 60 of the) first device via a wired (or wireless) communication link, such as link 7.

In one aspect, the camera 62 is a complementary metal-oxide-semiconductor (CMOS) image sensor that is capable of capturing digital images as image data that represent a field of view of the camera, where the field of view includes a scene of an environment (e.g., the physical environment 190) in which the device is located. In some aspects, the camera may be a charged-coupled device (CCD) camera type. The camera is configured to capture still digital images and/or video that is represented by a series of digital images. In one aspect, the camera is an "external" camera that is arranged to capture scenes that expand away from the device (e.g., the camera may be positioned to have a field of view that extends in a front direction and away from the device).

The controller 60 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform one or more operations as described herein. For example, the controller may be configured to perform image and/or audio rendering operations in order to present (display) image (video) data using the display 6 and/or output audio data via the left and/or right speakers 4 and 5. In one aspect, the controller may perform these operations to present XR environments. For example, the controller may retrieve graphical (image) data (e.g., three-dimensional (3D) models, etc.) from (e.g., local or remote memory storage) and 3D render the XR environment. In addition, the controller may render the XR environment in real-time based on user input, as described herein. For example, the controller may receive user input (e.g., from a user-input device communicatively coupled to the device). This input may adjust the user's perspective within the environment, which would therefore change what is displayed on the display 6. The controller uses this input to update the renderings of the XR environment. In addition, the controller is configured to perform audio signal processing operations to render audio data of the XR environment to produce one or more driver signals for driving the device's speakers. This rendering may be a spatial rendering in order to provide an immersive audio experience to the user of the device. In another aspect, at least some rendering may be performed by a remote device (e.g., a remote electronic server), with which the controller is communicatively coupled (via the network interface 61). In this case, the server may render the XR environment and transmit rendered data to the controller for presentation. In addition, the controller 60 may be configured to perform time-alignment operations, such that the first device 1 and one or more devices (e.g., second device 2) become configured to playback time-aligned audio content. More about these operations is described herein.

In one aspect, the controller may be configured to retrieve data (e.g., image data, audio data, and/or metadata) from local or remote memory storage for audio/video playback by the device 1 and/or headset 15 to which the device is communicatively coupled. In some aspects, the controller may receive at least some data from one or more other electronic devices. For instance, the controller may receive audio data from another electronic device (e.g., device 2) with which the first device 1 is synchronizing audio/video playback. Similarly, the first device may transmit data to one or more other (remote) devices for remote device playback.

Figure 3:
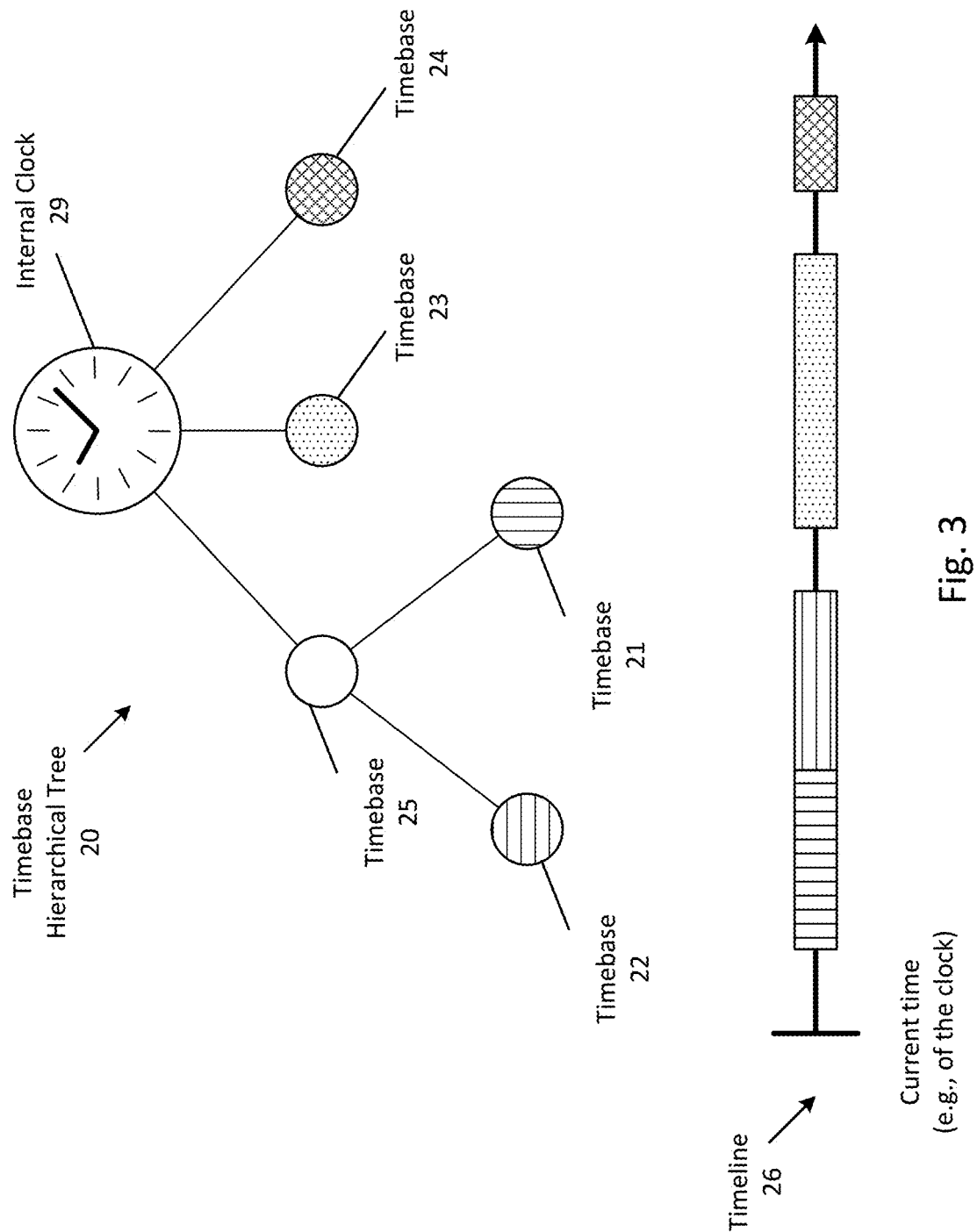
FIG. 3 shows a timebase hierarchical tree for media playback by the first electronic device according to one aspect.

FIG. 3 shows a timebase hierarchical tree (or timebase tree) for media (e.g., audio) playback by the first device according to one aspect. Specifically, this figure is illustrating a timebase hierarchical tree 20 that is a hierarchical description of time and events that are to occur at particular moments in time with respect to one another by the first device. As shown, the tree includes several timebases 21-25, each of which has (or defines) a relationship with either a clock (e.g., an internal clock 29) of the first device or another timebase from which it branches. For instance, timebases 23 and 24 define a relationship with the internal clock 29 (the root of the tree) and timebases 22 and 21 define a relationship with timebase 25, which defines a relationship with the clock 29. Thus, each timebase is a child that has a relationship to a parent, which may be another timebase or a clock. In one aspect, each timebase may include one or more parameters (or characteristics) that define the relationship. For instance, each timebase may be represented as $$T_{child} = R*(T_{parent} - T_a) + T_b$$

where $T_{child}$ is a (current) time of the timebase, $T_{parent}$ is the (current) time of the parent clock or another timebase with which $T_{child}$ has a relationship, R is the rate at which the time of $T_{child}$ passes with respect to its parent, $T_a$ is an anchor time of the parent, and $T_b$ is an anchor time of the timebase. In one aspect, $T_{child}$ is a playback time of one or more assets (or pieces of media content) associated with the timebase with respect to the time of the parent clock or other timebase of which it is associated with. In one aspect, $T_a$ may be an offset of the time of the parent clock. In another aspect, $T_b$ may represent the child timebase's time that corresponds to the offset of the parent clock. For instance, $T_b$ may be set to the child's desired time, while $T_a$ may be set to the parent's current time, in order for $T_{child}$ to start at the desired $T_b$.

In one aspect, the (e.g., controller 60 of the) system 10 may define audio playback of one or more pieces of audio content (e.g., associated with the XR environment) with respect to the tree 20. In particular, a timebase within the tree may describe playback (or a playback state) of a particular piece of audio content (e.g., an audio file) and may describe an affine relationship to either another timebase or a clock, as described herein. For example, timebase 22 may describe a timing of playback of a piece of audio content (e.g., the sound of drums as described in FIG. 1B). To ensure that the sound of the drums starts now (or immediately) and to playback at a normal speed (e.g., non-adjusted speed), timebase 22 may be defined as $$T_{(22)} = 1.0*(T_{(25)} - T_{(25)\_current\_time}) + 0$$

where the R is set to 1.0 (e.g., not adjusted), $T_{(25)}$ is the time of the parent timebase 25, $T_{(25)\_current\_time}$ (or $T_a$) is set to the current time of timebase 25 (e.g., having no offset), and $T_b$ is set to 0, which indicates that the timebase 22 is to start without an offset (e.g., with respect to the parent's time).

If, however, a user may wish to playback the sound at half speed and to start five seconds from now, the timebase may be $$T_{(22)} = 0.5*(T_{(25)} - (T_{(25)\_current\_time} + 5)) + 0$$

In one aspect, timebases may be structured differently, while providing the same relationship between a child and a parent. For example, the same type of playback described above for a sound to play back at half speed and start five seconds from now may be described as $$T_{(22)} = 0.5*(T_{(25)} - (T_{(25)\_current\_time}) - 2.5$$

As illustrated in this figure, timebases 21-24 each describe playback of media (e.g., one or more pieces of media content) on (or by) the first electronic device 1. For example, one or more timebases may describe playback of (e.g., one or more different or same pieces of) audio content, and/or one or more timebases may describe playback of video content. In one aspect, timebases of the tree 20 may represent playback of audio and/or video of a same piece of media content (e.g., sounds and images of an electronic (video) game that is being executed by the first (and second) electronic devices, a movie, and/or a XR environment).

In one aspect, the controller 60 may retrieve audio and/or image (video) data (e.g., as data files in any format) that is associated with the timebase tree 20. As described herein, the controller may retrieve the data from local or remote memory. For example, to present the XR environment, the controller 60 of the device 1 may receive audio and/or image (video) data of the environment as data files in any format, such as Universal Scene Description (USDz) format. These data files may include one or more audio assets and/or one or more animation (e.g., video, still images, etc.) assets. The device may generate a timebase tree in which each timebase of the tree is for an individual asset (e.g., video and/or audio)

within the USDz file. In one aspect, the controller may generate a final timebase to serve as a shared parent for at least some of the other timebases. Thus, the timebase hierarchical tree may represent a full playback of a piece of media content (e.g., one or more scenes within an XR environment).

This figure also illustrates a timeline 26, which starts at a current time of the internal clock and moves forward with respect to the internal clock 29. Specifically, the timeline 26 (e.g., the black line) may correspond to (or be) the time of the internal clock 29. The timeline shows the playback time and duration of the pieces of audio content that are associated with timebases 21-24 (as illustrated by corresponding hatches) with respect to time (e.g., the time of the internal clock 29). Thus, as shown, a first piece of audio content associated with timebase 21 starts first, followed immediately by a second piece of audio content associated with timebase 22. A third piece of audio content associated with timebase 23 starts after (e.g., a period of time from when) the second piece of audio content ends, and a fourth piece of audio content associated with timebase 24 starts after that. In some aspects, one or more timebases may not be associated with any particular piece of audio content, such as timebase 25 (as indicated by not having any hatching fill). Instead, the timebase 25 may be associated with video playback. In another aspect, the timebase 25 may not be associated with any asset (audio or video), but instead be a timebase that represents a relationship with the clock 29. As yet another example, a timebase may be associated with multiple pieces of media content, such as being associated with audio and video content.

Figure 4:
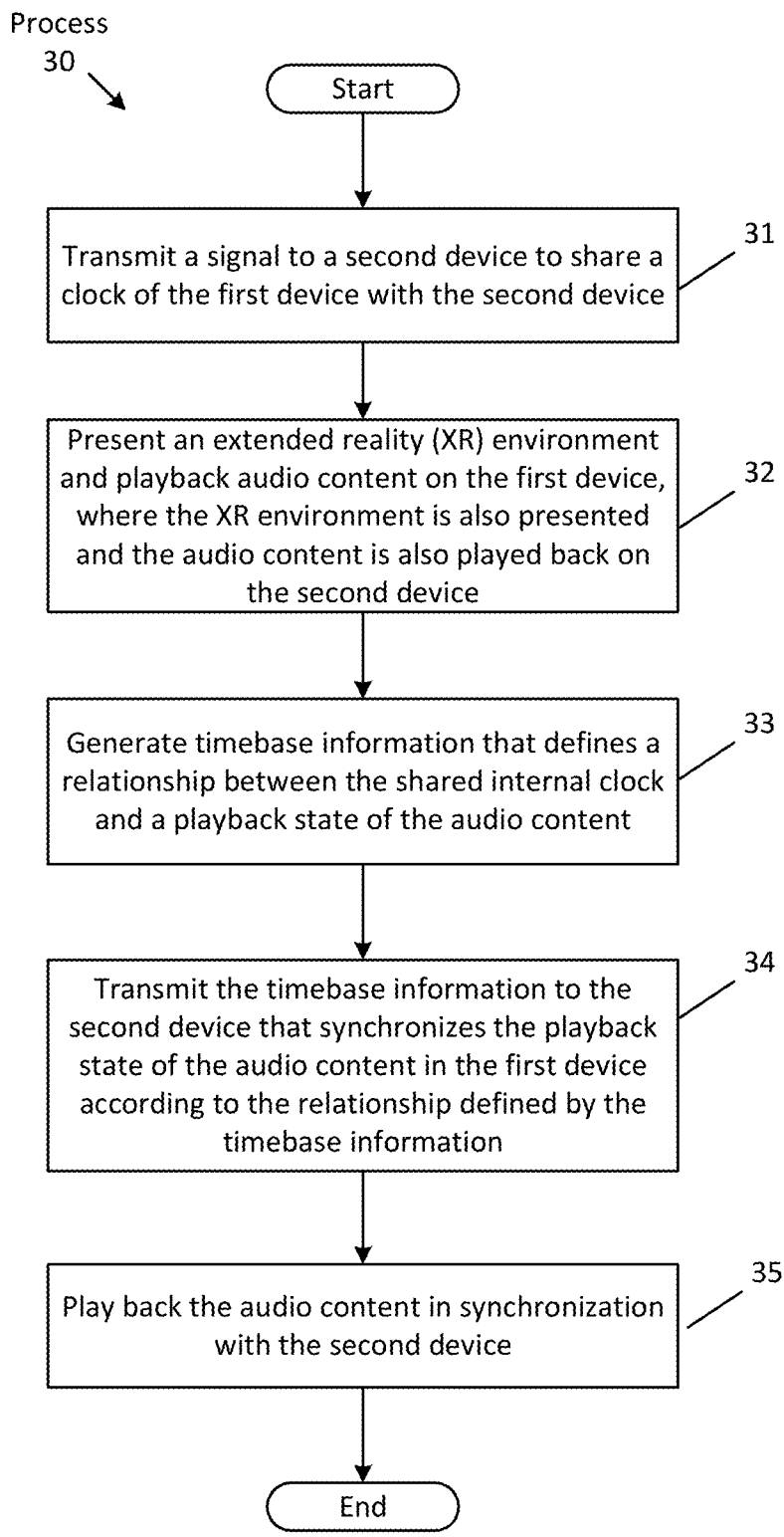
FIG. 4 is a flowchart of one aspect of a process to generate and transmit a timebase hierarchical tree (e.g., as timebase information) to the second electronic device in order to time-align media playback between both devices according to one aspect.

FIG. 4 is a flowchart of a process 30 that may be performed by the controller 60 of the first device 1 (and/or one or more controllers or processors of the second device 2) of the system 10, described herein. For instances, at least some of the operations of process 30 may be performed by the controller 60 of the first device 1 and/or at least some of the operations may be performed by a controller of the second device 2. In some aspects, at least some of the operations may be performed by (one or more processors of) another electronic device that is communicatively coupled with either device of the system, such as a remote server. Thus, this figure will be described with reference to FIGS. 1A-3.

FIG. 4 is a flowchart of one aspect of a process to generate and transmit a timebase hierarchical tree (e.g., as timebase information or timing data) to the second device in order to time-align media (e.g., audio and/or video) playback between both devices according to one aspect. The process 30 begins by the controller 60 transmitting a signal to a second (electronic) device (e.g., device 2 of FIGS. 1A and 1B) to share a clock of the first device with the second device (at block 31). Specifically, the controller may define (or determine) a clock to be shared between both devices, and may transmit (via the network interface 61) clock data associated with the clock to second device in order to define a corresponding clock at the second device, such that both clocks are aligned with one another. For example, the device may retrieve clock data from an external source (e.g., based on an atomic time provided by a GPS satellite network), with which to define the clock. In some aspects, the controller may define the clock according to timing messages received from other devices. For example, the controller may set the clock based on time information contained within timing messages that is received from a Network Time Protocol (NTP) server. In another aspect, the defined clock may be separate from an internal clock of the first device (e.g., a clock based on an electronic oscillator circuit integrated therein) that the first device uses to perform timely audio signal processing operations (e.g., where the first device uses the clock for playback of audio and/or video of the XR presentation). In some aspects, the internal clock of the first device may be set (or defined) based on the shared clock. In another aspect, the time information used to define the shared clock may be based on the internal clock of the first device. In another aspect, the clock of the first device may be defined by the controller by any known method.

In one aspect, the clock shared between both devices may be defined based on a proximity of the second device from the first device. Specifically, the controller may be configured to determine whether the second device is located within a threshold distance (e.g., one foot) of the first device. For instance, the controller may obtain location data (e.g., GPS data) from the second device and obtain location data associated with the first device, and determine a distance based on a comparison of both device's location data. In another aspect, the controller may determine distance from the second device by measuring round trip times of one or more data packets that are exchanged between both devices. In another aspect, the controller may make this determination based on sensor data from one or more sensors that are communicatively coupled with the controller (and/or coupled to the first device). For instance, the controller may receive image data from the camera 62, and may be configured to perform an image recognition algorithm upon the image data to detect another device. Once another device is detected, the controller determines the location of the device (with respect to the first device) based on the image data. For instance, the controller may determine the position and/or orientation of the first device (e.g., from an inertial measurement unit (IMU) integrated therein), and may determine the location of the other device with respect to the position of the first device by analyzing the image data (e.g., pixel height and width).

In one aspect, in response to the second device being located within the threshold distance, the controller may transmit clock synchronization messages using IEEE 802.1AS protocol in order to synchronize a clock of the second device with the clock of the first device. If, however, the second device is located outside the threshold distance, the second device's clock may be defined based on timing information from the NTP server. In particular, the controller may signal the second device to set a clock using the time information received by the second device from the NTP server. In one aspect, both devices may set their clocks based on the time information from the NTP server in response to the second device being located outside the threshold distance. Thus, both devices share clocks that are set based on separately received time information from one or more NTP servers.

The process 30 continues by the controller 60 presenting a XR environment (such as environment 11) and playing back audio content on the first device, where the XR environment is also presented and the audio content is also played back on the second device (at block 32). Specifically, the controller presents the XR environment in which the first user 8 and the second user 9 of the second device are participants by rendering graphical data, as described herein. As described herein, along with graphically rendering the XR environment, the controller may render and playback one or more pieces of audio content. For instance, the audio content may be associated with the XR environment (e.g., ambient virtual sounds). In another aspect, the audio content may be associated with user input. For example, the controller may receive user input via a user-input device (e.g., controller) to interact with a virtual object within the XR environment (e.g., the drums 14 in FIG. 1B). In this case, the audio content is to be played back by both devices in response to the user-interaction with the virtual object.

The controller 60 generates a timebase hierarchical tree (e.g., as timebase information or timing data) that defines a relationship between the shared clock and a playback state of the audio content (at block 33). Specifically, the controller generates (or produces) a timebase hierarchical tree that includes a first timebase that defines a relationship between the shared clock and the internal clock of the first device and a second timebase that defines a relationship between the first timebase and a playback state of the audio content. Thus, the first timebase represents the internal clock of the first device, where both the first timebase and the internal clock are rooted (e.g., synchronized according) to the shared clock. In one aspect, the playback state may indicate an initial playback of the audio content and the relationship indicates that the audio content is to be played back at a playback time after a current time of the shared clock at a playback rate. For example, the timebase may indicate the rate (R) as being the normal speed, and the playback time may be an offset (e.g., three seconds), as described herein. In another aspect, the playback state may indicate other states of the audio content, such as a stop state and a pause state. In some aspects, the timebase information may include identification information of which audio content is defined as having the relationship. In some aspects, the timebase tree may be generated as a data structure that includes the timebase information (and/or the identification information).

As described herein, the generated timebase hierarchical tree may include two timebases. In one aspect, the generated tree may include more or less timebases. For instance, the generated tree may include one or more timebases that each represent a relationship between one or more (internal) clocks of the device and one or more other clocks and/or one or more playback states of pieces of audio content.

The controller 60 transmits the generated timebase information to the second device that synchronizes the playback state of the audio content in the second device according to the relationships defined by the tree (at block 34). Specifically, the controller may serialize the timebase information (e.g., data structure) into another data format (e.g., extensible markup Language (XML) format, etc.). The serialized information is transmitted to the second device (e.g., via the communication link 7), which is configured to reconstruct the timebase information, as described herein. As a result, both devices include the same timebase information, where the timebase information share a same internal (or two synchronized internal) clocks.

The controller plays back the audio content in synchronization with the second device (at block 35). Specifically, since both devices include the same timebase hierarchical trees (e.g., timebase information), the devices become configured to synchronize playback of the audio content. For instance, both devices may render the audio content according to the timebase associated with the audio content. For instance, the controller may receive (or retrieve) an audio signal that contains the audio content (e.g., from local memory or from a remote memory storage, such as a remote server). The controller may render the audio signal according to the timebase to produce at least one driver signal, and drive the left speaker 4 and/or the right speaker 5 with the at least one driver signal (e.g., using a driver signal to drive speaker 4 and using another driver signal to drive speaker 5). In one aspect, the controller may transmit (e.g., using the network interface 61) the driver signal(s) to the headset 15 to drive the left and/or right speakers. In one aspect, a controller of the second device may perform at least some of the same operations in order to render the audio content. As a result, both devices produce driver signals that have a same playback rate and are to playback at a same playback time as indicated by the timebase. In one aspect, both devices may drive their respective speakers (either integrated therein or a part of another audio output device, such as the headset 15 shown in FIGS. 1A and 1B) using the driver signals at the playback time according to the shared clock (or according to another timebase).

In one aspect, the controller 60 of the first device 1 may perform one or more additional audio signal processing operations upon (e.g., the audio signal of) the audio content. For instance, the audio signal may be spatially rendered by applying one or more spatial filters (e.g., Head-Related Transfer Functions (HRTFs)) in order to spatialize the audio. As another example, the audio signal may be spectrally shaped by applying one or more audio processing (e.g., linear) filters (e.g., a low-pass filter, a band-pass filter, etc.).

Figure 5:
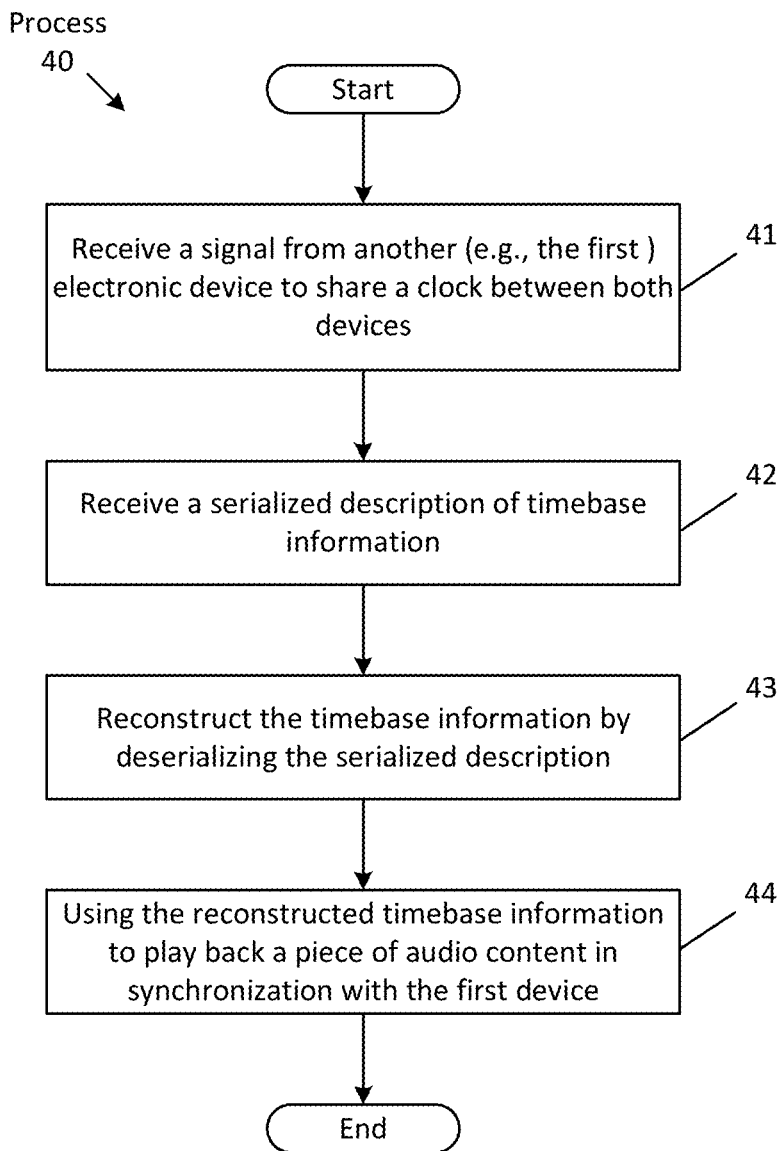
FIG. 5 is a flowchart of one aspect of a process to reconstruct and use received timebase information to synchronize media playback with one or more other devices, according to one aspect.

FIG. 5 is a flowchart of one aspect of a process 40 to reconstruct and use a received timebase information to synchronize media (e.g., audio and/or video) playback with one or more other devices, according to one aspect. Specifically, this process will be described with reference to the second device 2 with which the first device 1 wishes to synchronize playback, as described in FIG. 4. In particular, one or more controllers of the second device may perform one or more of the operations of this process. In another aspect, at least some of these operations may be performed by the (e.g., controller 60 of the) first device 1, which performed the operations of process 30. In which case, another device may have transmitted a timebase tree to the first device 1 for synchronized playback.

The process begins by (e.g., a controller of) the second device receiving a signal from another (e.g., the first) device to share a clock between both devices (at block 41). In one aspect, this signal may be the same signal that was transmitted by the first device 1 at operational block 31 of process 30 in FIG. 4. The second device receives a serialized description of timebase information (e.g., a hierarchical tree) generated by the first device with respect to the shared clock, as described herein (at block 42). The second device reconstructs the timebase information by deserializing the serialized description (at block 43). Specifically, the second device reconstructs the hierarchical tree defined by the timebase information, where the tree may include one or more timebases, where each timebase defines a relationship between a clock and/or another timebase. For example, the tree may include a first timebase that defines a relationship between the shared clock between the devices and an internal clock of the first device. Thus, the first timebase (e.g., which is synchronized with the internal clock of the first device, since both the internal clock of the first device and the first timebase operate with respect to (or are rooted in) the shared clock). The tree may also include a second timebase that defines a relationship between the first timebase and a playback state of a piece of audio content that is to be played back between both devices. The second device uses the reconstructed timebase information to playback the piece of audio content in synchronization with the first device (at block 44).

Some aspects perform variations of the processes 30 and 40 described in FIGS. 4 and 5, respectively. For example, the specific operations of at least some of the processes may not be performed in the exact order shown and described. The specific operations may not be performed in one continuous series of operations and different specific operations may be performed in different aspects. For instance, the controller may signal the second device to share a clock once it is determined that both devices are to playback a piece of audio content. In another aspect, both devices may already be sharing a clock (e.g., the first device may have previously transmitted timing data), as describe herein. In that case, the operations of block 31 may be omitted in future performances of this process. In another aspect, the presentation of the XR environment at block 32 may be performed before or contemporaneously with the playback of the audio content at block 35. For instance, the controller may determine that the first user wishes to participate in the XR environment, as illustrated in FIG. 1B. In some aspects, along with transmitting the timing data to the second device, the controller may transmit the same (or similar) data to one or more other devices, such that each device plays back time-aligned audio content.

In addition, although only described as generating the timing data with reference to playback of one audio content, the process 30 may be performed for generating the timing data for playback of one or more pieces of audio content. For instance, the timing data may include a timebase hierarchical tree with several timebases, each describing playback of one or more pieces of audio content.

In one aspect, a timebase hierarchical tree (timing data) may be updated and retransmitted to the second device to replace its (and the first device's) existing tree(s). For example, once the tree is transmitted, the user of the first device may change the playback state of the audio content. As an example, the user may want to slow the playback rate (e.g., from 1.0 to 0.5) of (audio content associated with) one or more timebases, or may want playback to begin a period of time after playback of another piece of audio content. In response, the controller 60 may generate adjusted tree and transmit the adjusted tree to the second device. Specifically, to generate the adjusted tree the controller may generate a new tree by using the existing timing data of the previously generated tree that is being shared between the devices, along with (or in addition to) any adjustments made by the user. In other words, the new tree may include adjusted relationships between one or more (e.g., preexisting and/or new) timebases based on the change (or update) to the original tree.

In one aspect, the adjustment to the existing tree may be an addition of one or more timebases (e.g., based on the user wanting another piece of audio content to be played). For example, the controller may determine that another (second) audio content associated with the XR environment is to be played back by both devices (e.g., a sound of a virtual guitar being played). The controller may add a new timebase for playback of the second audio content into the timebase hierarchical tree, and may define a relationship for that timebase to an existing timebase. In one aspect, the relationship may be between another timebase within the tree, such as the timebase associated with the drum sound described above.

In one aspect, such a relationship may be made such that any (e.g., future) adjustments to a timebase, may also affect playback of other content. For example, adjusting a rate of a timebase may adjust playback of one or more children timebases of that parent timebase. As a result, audio content associated with the children timebases may be played back differently (e.g., the playback timing may be adjusted) according to the adjusted rate. In one aspect, adjustments to timebases may also affect (or be applied) to one or more children of that timebase. In another aspect, adjusting a timebase may not affect (e.g., playback of audio content associated with) one or more children of that adjusted timebase. Thus, the controller may dynamically perform timing adjustments that affect several timebases, by only adjusting a parent timebase. Thus, the first device may generate new timing data that includes data of the original (or previous) timing data and defines another relationship between the relationship of the previous timebase and a second playback state of the second audio content. For instance, this new timebase may branch from one of the four timebases 21-24 illustrated in FIG. 3.

In another aspect, the controller 60 may receive similar timing data from the second device. For example, both devices may generate separate timing data, each associated with a different timebase tree. Each device may use both trees to synchronize audio playback. In one aspect, both trees may share the same or different clock. In another aspect, both devices may be configured to adjust shared timing data. In this case, rather than generate the timing data at block 33, the first device may adjust the timing data (e.g., by adding a timebase to the timebase tree), and transmit the adjusted timing data to the second device. In some aspects, the second device may perform similar operations.

As described thus far, the processes 30 and 40 may be performed to time-align playback of media content, such as audio content. In another aspect, at least some of the operations performed by these processes may be performed to time-align playback of other media content, such as video content and/or one or more operations (e.g., logical functions) performed by one or more software applications. In another aspect, time-alignment operations may be performed in order to synchronize playback states of audio content and other media content, such as video content.

Figure 6:
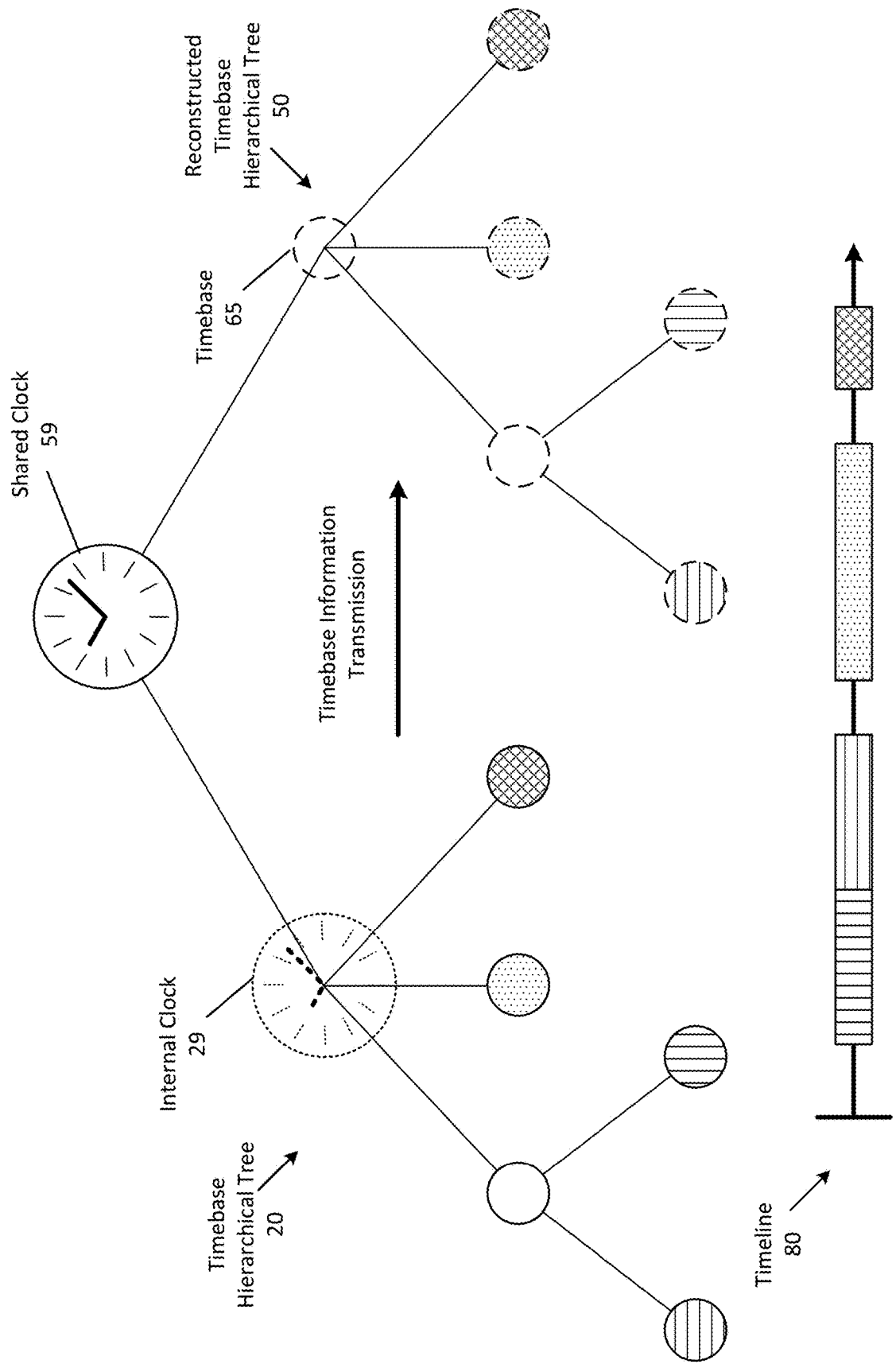
FIG. 6 shows the timebase hierarchical trees of both the first and second devices that share a common clock according to one aspect.

FIG. 6 shows timebase hierarchical trees of both the first and second devices that share a common clock according to one aspect. Specifically, this figure illustrates the timebase information transmission from the first device to the second device (e.g., as described in FIGS. 4 and 5). In particular, this shows the timebase hierarchical tree 20 of the first device 1 having been transmitted (e.g., serialized and transmitted over a computer network) to the second device 2, and the second device having reconstructed the hierarchical tree 20 as hierarchical tree 50.

As shown, the first node (or root) of each of the hierarchical trees is a common clock 59 that is shared between both devices. As a result of both devices' trees sharing the same root clock, both devices will playback time-aligned audio content, as described herein. Specifically, both devices are sharing a same timeline 80, which is similar to timeline 26, except that timeline 80 (e.g., the black line with the arrow) represents the time of the clock 59 that is shared between both devices. This allows both devices to have time-aligned audio playback, as described herein.

This figure also shows that the internal clock 29 of the first device 1 is being represented by a timebase 65 in the reconstructed tree 50. As described herein, this timebase may define a relationship between the shared clock 59 and the internal clock 29. As a result, this timebase may act as a final (or main parent) timebase for other timebases that branch off this timebase. In another aspect, the internal clock 29 of the first device may be defined (or set) with timing data of the shared clock 59. As a result, the shared clock 59 may be in place of the timebase 65 of the reconstructed timebase hierarchical tree 50.

As described herein, the first device may transmit timebase information to the second device in order for both devices to have (share) the same timebase hierarchical tree. Specifically, the tree generated by the first device and the reconstructed tree by the second device may share similar (or same) relationships between clocks and/or timebases, but the trees may be (e.g., structured) differently. For instance, the tree 20 of the first device includes relationships between an internal clock 29 of the first device and several timebases. In order to synchronize audio playback between the devices, this internal clock is defined as timebase 65 in the reconstructed tree 50. As a result, the reconstructed tree includes timebase 65, which represents a relationship between the internal clock 29 of the first device and the shared clock 59. Thus, even though the reconstructed tree 50 includes an additional timebase 65 in lieu of the internal clock 29 of the first device, both trees may be considered the same in the sense that they provide the same relationships, as described herein.

As described thus far, the timebase hierarchical trees 20 and 50 are for performing time-aligned audio playback between two or more devices. In another aspect, timebase trees may be used to align animations or video (e.g., associated with the XR environment) between devices. Thus, the system 10 may define video playback of one or more video assets associated with the XR environment with respect to one or more trees. In some aspects, a tree may define both audio and video playback, as described herein.

In one aspect, at least some of the operations of described herein (e.g., in processes 30 and 40 of FIGS. 4 and 5, respectively), may be performed by a machine learning algorithm. In another aspect, the machine learning algorithm may include one or more neural networks (e.g., convolution neural networks, recurrent neural networks, etc.) that are configured to perform the operations described herein.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform one or more of the operations (e.g., the operations described in processes 30 and/or 40 of FIGS. 4 and 5) described herein. In other aspects, some of these operations might be performed by specific hardware components that contain hardwired logic. Those operations might alternatively be performed by any combination of programmed data processing components and fixed hardwired circuit components.

According to one aspect of the disclosure, a method performed by a first electronic device includes signaling a second electronic device to share a clock in the first electronic device with the second electronic device, presenting an XR environment in which first and second users of the first and second devices, respectively, are participants and in which audio content is to be played back by both devices, generating timing data that defines a relationship between the shared clock and a playback state of the audio content; and transmitting the timing data to the second device that synchronizes the playback state between both devices according to the relationship defined by the timing data.

According to another aspect of the disclosure, an article of manufacture comprises a non-transitory machine readable medium storing instructions which when executed by a processor of a first electronic device causes the device to transmit a signal a second electronic device to share a clock of the first electronic device with the second electronic device; present an extended reality (XR) environment in which a first user of the first electronic device and a second user of the second electronic device are participants and in which audio content is to be played back by the first and second electronic devices; generate timing data that defines a relationship between the shared clock and a playback state of the audio content; and transmit the timing data to the second electronic device that synchronizes the playback state of the audio content in the second electronic device, with the playback state of the audio content in the first electronic device according to the relationship defined by the timing data.

In one aspect, the instructions to determine whether the second electronic device is located within a threshold distance of the first electronic device, wherein, in response to the second electronic device being located within the threshold distance, the instructions to signal the second electronic device to share the clock comprises instructions to transmit clock synchronization messages using IEEE 802.1AS. In another aspect, the non-transitory machine readable medium has further instructions to set the clock in the first electronic device based on time information that is received from a Network Time Protocol (NTP) server. In some aspects, to set the clock based on the time information is in response to the second electronic device being located outside the threshold distance. In one aspect, the instructions to signal the second electronic device to share the clock comprises instructions to signal the second electronic device to set a clock in the second electronic device using time information received by the second electronic device from the NTP server.

In one aspect, the non-transitory machine readable medium has further instructions to receive user input via a user-input device to interact with a virtual object within the XR environment, wherein the audio content is to be played back in response to the interaction with the vertical object. In some aspects, the timing data is first timing data, the relationship is a first relationship, the audio content is a first audio content and the playback state is a first playback state, wherein the non-transitory machine readable medium has further instructions to determine that a second audio content associated with the XR environment is to be played back by the first and second electronic devices; and generate a second timing data that includes data of the first timing data and defines a second relationship between the first relationship and a second playback state of the second audio content.

In one aspect, the playback state is to initiate playback of the audio content and the relationship indicates that the audio content is to be played back at a playback time after a current time of the shared clock at a playback rate. In some aspects, the non-transitory machine readable medium has further instructions to render the audio content according to the playback rate to produce a driver signal; and drive a speaker that is coupled to the first electronic device using the driver signal at the playback time according to the shared clock. In some aspects, the instructions to present the XR environment comprises instructions to display, on a display screen, image data that represents a virtual scene within the XR environment.

As described herein, the system (e.g., devices 1 and/or 2) is configured to perform time-aligned audio playback operations in order to synchronize audio playback between devices 1 and 2. For instance, device 1 may generate a timebase hierarchical tree that defines relationships between clocks and/or other timebases, where at least some timebases indicate how one or more pieces of audio content are to be played back with respect to a clock and/or timebase. In one aspect, these operations may be performed by an application (stored and being executed by the device 1) that is configured to playback audio (and/or video) content. For instance, such an application may a computer game that is configured to present an XR environment through the user 8 may participate with other uses via device 1. In some aspects, multiple applications may be executed (e.g., simultaneously) by the first device 1, where one or more of the applications may be configured to playback (e.g., same or different) media content. Thus, there is a need for performing time-aligned media playback operations in which playback of media content from one or more applications is synchronized according to timing data (e.g., a timebase hierarchical tree).

Figure 7:
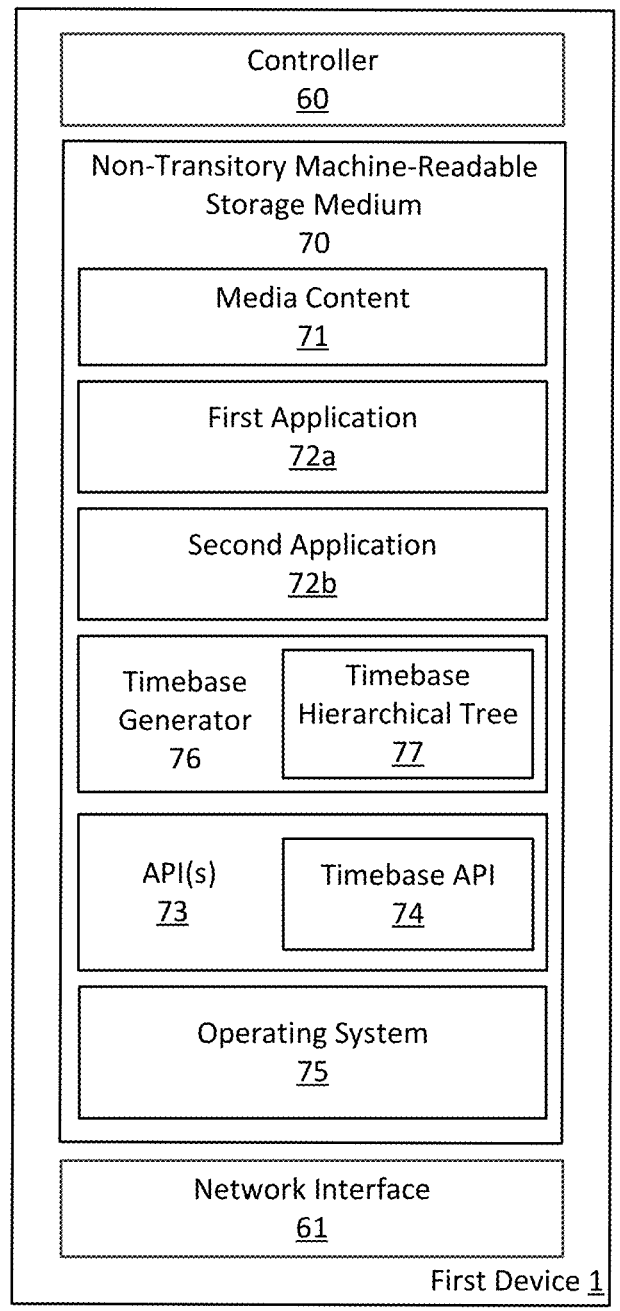
FIG. 7 shows a block diagram illustrating the first electronic device according to another aspect of the disclosure.

FIG. 7 shows a block diagram illustrating the first electronic device 1 according to another aspect of the disclosure. Specifically, this figure shows the first device that may be configured to perform time-aligned media playback operations for one or more applications that are being executed by the device in order to synchronize media playback at the first device and/or at one or more other devices (e.g., second device 2). In one aspect, other devices (e.g., the second device 2, illustrated in FIGS. 1A and 1B) with which the first device synchronizes media content may include similar (or the same) components (and/or software components) illustrated and described in this figure.

The first device 1 includes the controller 60, the network interface 61, and a non-transitory machine-readable storage medium (e.g., memory) 70. Examples of non-transitory machine-readable storage medium may include read-only memory, random-access memory, CD-ROMS, DVDs, Magnetic tape, optical data storage devices, flash memory devices, and phase change memory. Although as being illustrated as being contained within the first device 1, one or more components may be a part of separate electronic devices, such as the medium 70 being a separate device, such as a data storage device. In which case, the separate medium may be communicatively coupled (e.g., via the network interface 61) with the controller 60 in order to perform one or more of the operations described herein.

As shown, the storage medium 70 has stored therein media content 71, two applications 72a and 72b, a timebase generator 76, one or more application programming interfaces (APIs) 73, and an operating system 75. In one aspect, the medium may include less or more components. For instance, the medium may include one or more applications. In another aspect, the medium may not include media content. In which case, media content (e.g., audio and/or video) may be retrieved from an external (or remote) data storage device that is communicatively coupled with the first device 1, as describe herein.

The operating system (OS) 75 is a software component that is responsible for management and coordination of activities and the sharing of resources (e.g., controller resources, memory, etc.) of the first device 1. In one aspect, the OS acts as a host for application programs (e.g., applications 72a and 72b) that run on the device. In one aspect, the OS provides an interface to a hardware layer (not shown), and may include one or more software drivers that communicate with the hardware layer. For example, the drivers can receive and process data packets received through the hardware layer from one or more other devices that are communicatively coupled to the device (e.g., user input devices, such as a display 6, which may be a touch-sensitive display screen).

The media content 71 comprises any type of media that may be used and processed by one or more applications (e.g., the first application 72a) that are being executed by (e.g., the controller 60 of) the first device. For example, the media may include content (e.g., audio content, video content, etc.) that may be used by the applications for audio and/or visual playback to the user of the first device. In another aspect, the media content 71 may include any data that may be displayed to the user, such as text, images, etc. As described herein, the media may include (digital) data that may be used by one or more applications that are executing on the device to perform one or more operations. For instance, the media content may include metadata that is associated with other data (e.g., images) stored in the media content. In another aspect, the media content may store metadata that indicates (or defines) one or more logical functions that may be performed by one or more applications that are executing on the device. For instance, a logical function may include one or more operations that are to be performed by an application (e.g., a command to perform any task). As an example, when the application is a word processing application that is configured to generate and present spreadsheets, a logical function may include an operation to display a particular spreadsheet (e.g., on display 6) to the user.

The first and second application 72a and 72b may be any type of (software program) application (that includes instructions and), which when executed causes the (e.g., controller 60 of the) first device 1 to perform one or more operations. Example applications include a telephony application, a word processing application, internet browser application, messaging application, etc. One or more applications may work in concert with other applications that are currently being executed by the controller. For example, launching an application on the device or interacting with an application (e.g., via user input received via the touch-sensitive display 6) can launch an application or cause an action to be performed on the device.

In one aspect, at least one of the applications may perform audio/video playback operations (e.g., by displaying video/images on the display 6 and/or using one or more audio signals to drive speakers 4 and 5 to output sound). For instance, the first application 72a may be an application that presents an XR environment, such as a (e.g., online) gaming application, through which the user of the first device may participate and interact (e.g., via one or more input devices that are communicatively coupled with the device 1) with other users, as described herein. As another example, the first application may be any type of media playback application that plays back content, such as movies, musical compositions, etc. In which case, the application may retrieve the content from the media content 71 for playback.

In some aspects, one or more of the applications (e.g., the second application 72b) may be a third-party application created by a third-party developer (e.g., a developer or supplier of software applications that is not the same as the owner or operator (manufacturer or vender) of the first device1), via one or more software programs (e.g., a Software Development Kit (SDK)) or as part of a browser tool kit. In which case, a third-party application may be retrieved (e.g., downloaded) from a remote storage device via a computer network (e.g., from a remote server over the Internet) and installed into the memory 70. In other aspects, one or more of the applications (e.g., the first application 72a) may be a native application of the first device, which may have been developed and supplied by the manufacturer of the first device.

The timebase generator 76 is configured to generate one or more timebase trees for time-aligning media playback of one or more applications. For instance, the generator may perform at least some of the operations described in FIG. 4 to generate a tree (e.g., tree 77, which may be the same or similar as tree 20) as timebase information that defines relationships between one or more playback states of audio/video content associated with one or more applications (e.g., application 72a), and one or more clocks or other timebases of the tree. For instance, when the application 72a is launched, the application may call upon the timebase generator to perform the time-aligned operations to generate the tree 77 to synchronize audio and/or video content at the first device 1 and/or at one or more other devices that re playing back (at least a portion of) the audio/video content, such as device 2 of FIG. 1.

In one aspect, although illustrated as being a separate software component stored within memory 70 (at least a portion of) the generator 76 may be a part of one or more other software components. For instance, the first application 72a and/or the operating system 75 may include the generator, and may be configured to perform one or more time-aligned media playback operations of the generator to generate (and transmit) timebase trees for synchronized playback of media content, as described herein.

The one or more APIs 73 are programming interfaces that allow an application to interact with another application. For example, the APIs provide various function calls, messages, or other means in which one or more parameters, can be transferred via the API between a "calling" application (or program code) and an application that is being called. The APIs include a timebase API 74 that provides an interface for applications, such as third-party applications to generate timebase trees and to adjust existing timebase trees (e.g., generated by the same application or another application, such as the first application 72a). Specifically, the API 74 allows applications created by third-party developers, such as the second application 72b, to interface with the timebase generator 76 (and/or other applications that perform timebase generator operations, as described herein) to perform time-aligned media playback operations in order to synchronize playback of media content of the application 72b (e.g., between one or more devices). As a result, media of the second application (and/or media of the first application 72a) may be time-aligned (e.g., with respect to one or more clocks and/or one or more timebases of a timebase tree) between one or more devices. In addition, this may allow media of one application to be synchronized with playback of media of another application. More about the timebase API and using it to generate and/or adjust existing timebase trees is described herein.

Figure 8:
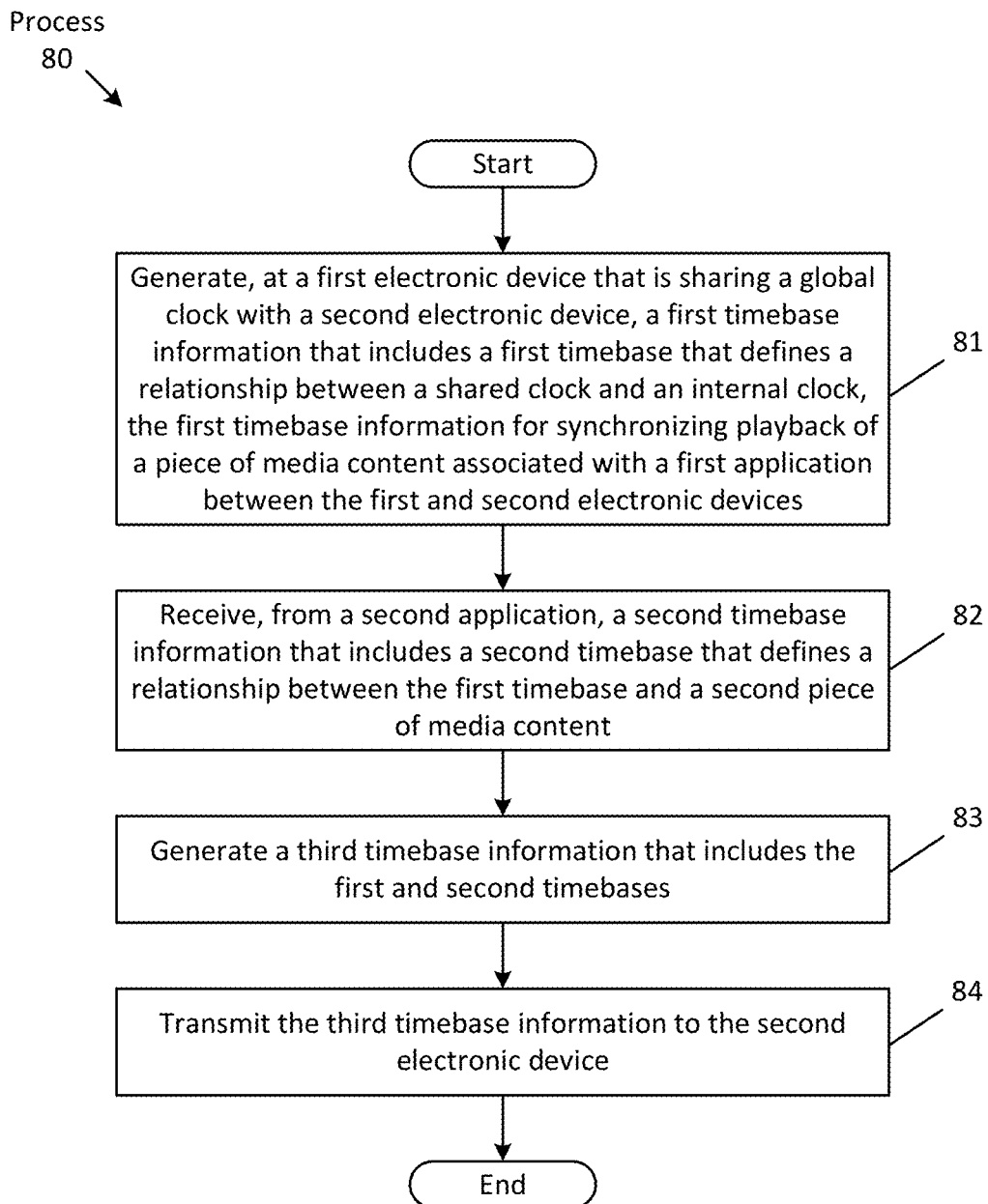
FIG. 8 is a flowchart of one aspect of a process to time-align media playback of one or more applications that are being executed by one or more electronic devices.

FIG. 8 is a flowchart of one aspect of a process 80 to time-align media playback of one or more applications that are being executed by one or more electronic devices. In one aspect, at least some of the operations may be performed by the (e.g., controller 60 of the) first device 1. Specifically, the operations will be described in reference to operations performed by one or both of the applications 72a and 72b while executed by the controller in order to synchronize audio playback between the first application and one or more other applications, such as the second application 72b. In another aspect, (at least some of) the operations may be performed by other software components, such as the timebase generator 76 that is being executed by the controller 60.

The process 80 begins by the application generating, at the first device that is sharing a global clock with (at least) the second device 2, a first timebase information (e.g., timebase tree) that includes (at least) a first timebase that defines a relationship between a shared clock between the devices and an internal clock of the first device, the first timebase information for synchronizing playback of a piece of media content (e.g., audio and/or video content) associated with a first application 72a between the two devices (at block 81). In one aspect, these operations may be similar to the operations described in block 33 of process 30 of FIG. 4 to generate timebase information. For example, the first timebase information may include additional (one or more) timebases, each timebase for defining a relationship between (e.g., playback states of) one or more pieces of media content (of the first application) and one or more clocks or one or more other timebases within the timebase tree. In one aspect, this timebase information may be generated to synchronize media content, such as content associated with an XR environment that is presented by (by the application(s) that are being executed by) both the first and second devices.

The application 72a receives, from a second application, a second timebase information that includes a second timebase that defines a relationship between the first timebase and a second piece of media content (at block 82). In particular, the first application may receive input from an audio processing routine (or subroutine) of the second application 72b. In which case, the input may include one or more timebases (e.g., as digital data). In another aspect, the input may be data of at least one timebase. For instance, the received data may include a playback state of the second piece of audio content and data (e.g., one or more timebase parameters, as describe herein) that defines the relationship between the first timebase and the playback state of the second piece of audio content. In one aspect, the input from the second application may be received via an API (e.g., API 74) through which the second application communicates with the first application. More about the second application communicating via the API is described herein.

In one aspect, the second timebase information may be another timebase tree that includes one or more timebases, where each timebase defines a relationship (e.g., using timing data) between a piece of media content, such as audio content and/or video content, which may be associated with the second application and a clock or a timebase. In one aspect, the clock or the timebase to which each timebase of the second timebase information may be associated with (or contained within) the second timebase information, and/or be associated with another timebase tree. Specifically, the second timebase information may be generated with respect to a timebase of the timebase tree that has (already) been generated by the first application. In which case, a timebase of the second timebase information may be with respect to another timebase generated by the first application. As a result, timebases within the generated timebase tree (by the first application) and timebases within the received timebase tree (from the second application) may be defined with respect to the shared global clock between the two devices, as described herein. More about the second application generating timebase information is described herein.

In one aspect, the relationships defined by the second timebase information may synchronize media playback of different pieces of media content. Specifically, the second timebase information may be for synchronizing media content that may be associated with media content of the first application. For example, the second piece of media content may be associated with the first piece of media content by the first piece of media content including audio content (e.g., of the first application), while the second piece of media content may include video content that is associated with the audio content. As a result, the generated first timebase information and the received timebase information may be used (e.g., by the first and second devices) to synchronize playback of the audio content with the video content based on relationships the relationships defined by (at least) the first and second timebases.

The first application generates a third timebase information that includes the first and second timebases (at block 83). Specifically, the first application may combine (add) the generated first timebase information with the received second timebase information. In particular, the first application may add the timebases to produce the third timebase information. As a result, the first application may create a combined timebase tree, where the timebase trees of the first and second timebase information are portions (or parts of) the combined tree. In one aspect, the first application may return, in response to the received input, return output to the audio processing routine of the second application. In one aspect, the output may include the combined timebase information.

The third timebase information (or output by the first application) is then transmitted to the second electronic device (at block 84). These operations may be similar to the operations described in block 34 of FIG. 4. In one aspect, both devices may use the timebase tree of the third timebase information (e.g., as described in block 35 of FIG. 4) to synchronize playback of media content (associated with the transmitted timebase information) at the first device and/or other devices, such as the second device. For example, the audio content (e.g., of the first piece of media content) may include audio effects, while the video content (e.g., of the second piece of media content) includes animations or visual effects that are associated with the audio effects. As a result, playback of the content may synchronize the audio effects with the visual effects on both the first and second devices.

Figure 9:
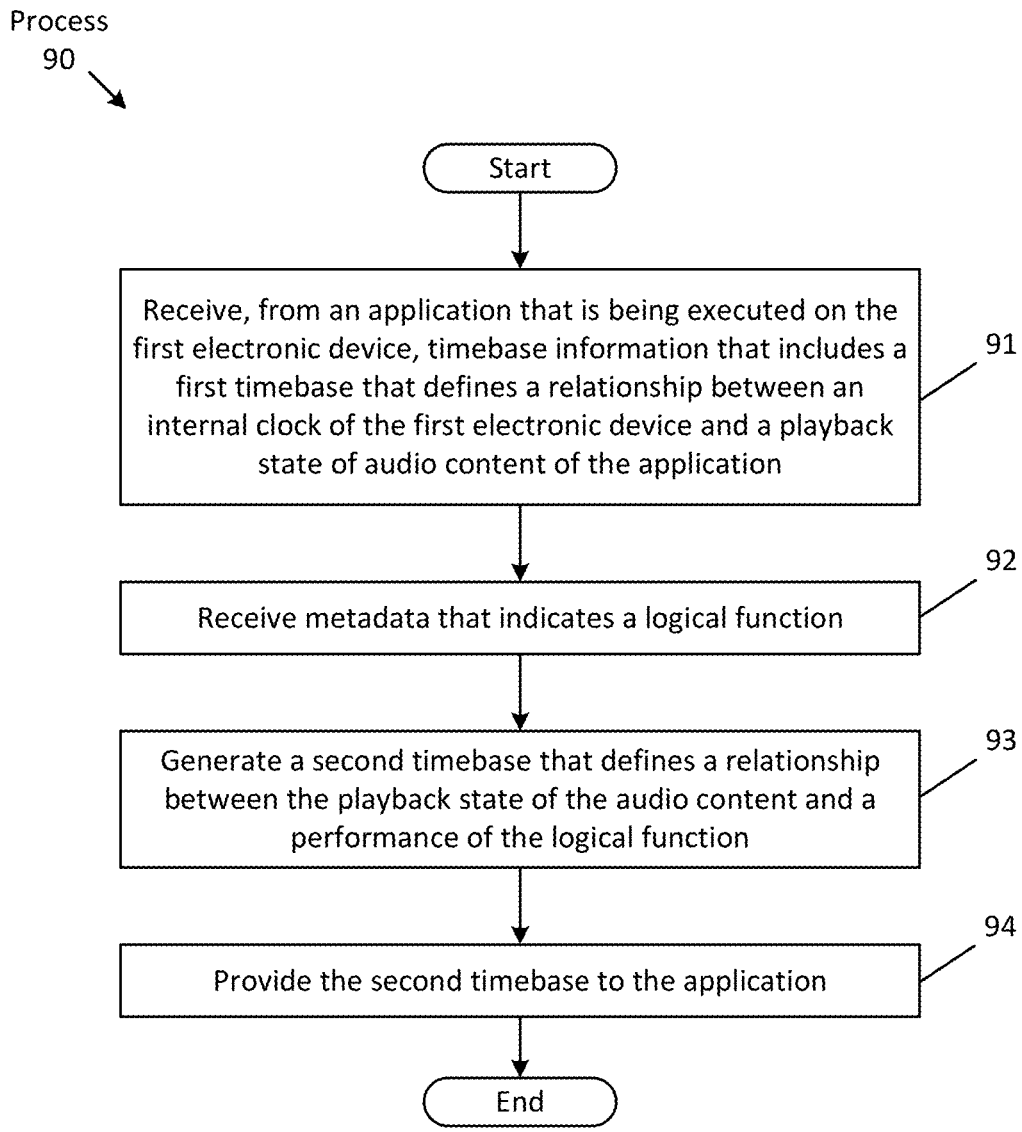
FIG. 9 is a flowchart of one aspect of a process to time-align media content playback by one or more electronic devices.

FIG. 9 is a flowchart of one aspect of a process 90 to time-align media content playback by one or more electronic devices. Specifically, this process describes operations performed by an application to time-align one or more logical functions (to be) performed by one or more software applications for media (e.g., audio) playback by one or more devices. Although described as specifically, synchronizing logical functions with audio, at least some of the operations described in this process may be performed to time-align other types of media for playback by one or more applications that are being executed on various devices. For example, at least some of these operations may be performed to time-align audio and video content, as described herein. In one aspect, the operations described in this process may be performed by a third-party application, such as the second application 72b, which interfaces with the timebase API 74, as described herein. In another aspect, at least some of the operations may be performed by the first application (e.g., an application that is not a third-party application).

The process begins by the second application receiving, from an application (e.g., the first application 72a) that is being executed on the first device, timebase information (e.g., a timebase tree) that includes a first timebase that defines a relationship between a playback state of audio content of the application and an internal clock of the first device or another timebase of the received timebase tree (at block 91). As described herein, the second application may interface with the timebase API 74 to receive data. Specifically, the second application may provide a function call or message to the timebase API with a request to receive (retrieve) at least a portion of a generated timebase tree (e.g., tree 77), and in return, the API may provide the requested information. In one aspect, the received timebase information may be a timebase tree that has been serialized, as described herein. In another aspect, the timebase information may be a portion of (or a sub-tree) of another timebase tree, or may include aspects or information (details) of the tree. For instance, the second application may receive one or more parameters or characteristics of a timebase that defines the timebase's playback time (e.g., R, $T_a$, and/or $T_b$).

The second application receives metadata that indicates a logical function (at block 92). In one aspect, the logical functions may represent operations performed by one or more applications that may be user-perceptible. For example, the logical function (which may be performed by one or more applications) may include displaying an image or animation on display 6. In some aspects, the metadata may be associated with the second application, where the second application is configured to perform the logical function. In another aspect, the metadata may be associated with another application. In some aspects, the application of which is to (or may) perform the logical function may be installed (and being executed) by one or more devices that are using a shared timebase tree to time-align media playback.

The second application generates a second timebase that defines a relationship between the first timebase of the received timebase information and a performance of (e.g., instructions to perform) the logical function (at block 93). In one aspect, the second application may generate the timebase, as described herein. In one aspect, the second timebase may be configured to synchronize the playback of the audio content with the performance of the logical function. For instance, when the logical function is an operation to display an animation, the second timebase may be configured to synchronize the playback state of the audio content associated with the first timebase with the displaying of the animation.

In one aspect, the second application may determine how to define the relationship based on various criteria. Specifically, the second application may determine an alignment to perform the logical function with respect to the playback state of the audio content to synchronize performance of the logical function with the audio content during playback by the first and second devices. For example, the second application may determine parameters or characteristics of the second timebase based on the first timebase and/or based on the metadata. In one aspect, the alignment may indicate that the logical function is to be performed at (and during) a same playback time of the audio content (e.g., as defined by the first timebase). In another aspect, the playback of the logical function may be determined to be different. For example, the rate of the second timebase may be slower (or faster) than the first timebase, such that the rate at which the logical function is performed is different than the rate at which the audio content is played back. As a result, the generated timebase may be based on the determined alignment.

The second application provides the second timebase to the application (at block 94). As a result, the application that receives the second timebase may combine the first and second timebases into one timebase tree, as described herein. For example, the second timebase may synchronize playback of audio content (e.g., of the first application) with the performances of one or more logical functions by the second application.

In one aspect, the operations described in process 90 may allow the second application to synchronize metadata (and/ or other media content) of one or more other applications with other media content that is associated (already) with a generated timebase tree. As an example, the received timebase information may indicate playback times of one or more pieces of audio content. In which case, the second application may generate one or more timebases in order to synchronize media of other applications with the pieces of audio content. In particular, the second application may receive the metadata from an application that manages and displays images (e.g., photos), where the metadata includes marked events or states of the photos (e.g., an order of photos, a priority of photos, etc.). With this, the second application may generate one or more timebases, each associated with metadata of one or more photos, such that the first device may synchronize playback of audio content with displaying one or more photos.

As described thus far, the second application may generate one or more timebases in order to add the generated timebases to an already existing timebase tree. In another aspect, the second application may perform operations to adjust timebases of a tree. For instance, the second application may adjust the relationship between a timebase and a piece of media content of one or more timebase trees. As an example, after providing the second timebase, as mentioned above, the second application may adjust the relationship defined by the second timebase, and provide the timebase with the adjusted relationship to the application to resynchronize the playback state of the audio content with the performance of the logical function, during playback by the first and second devices. For instance, the second application may adjust one or more parameters of the second timebase (e.g., the rate at which the logical function is performed).

Figure 10:
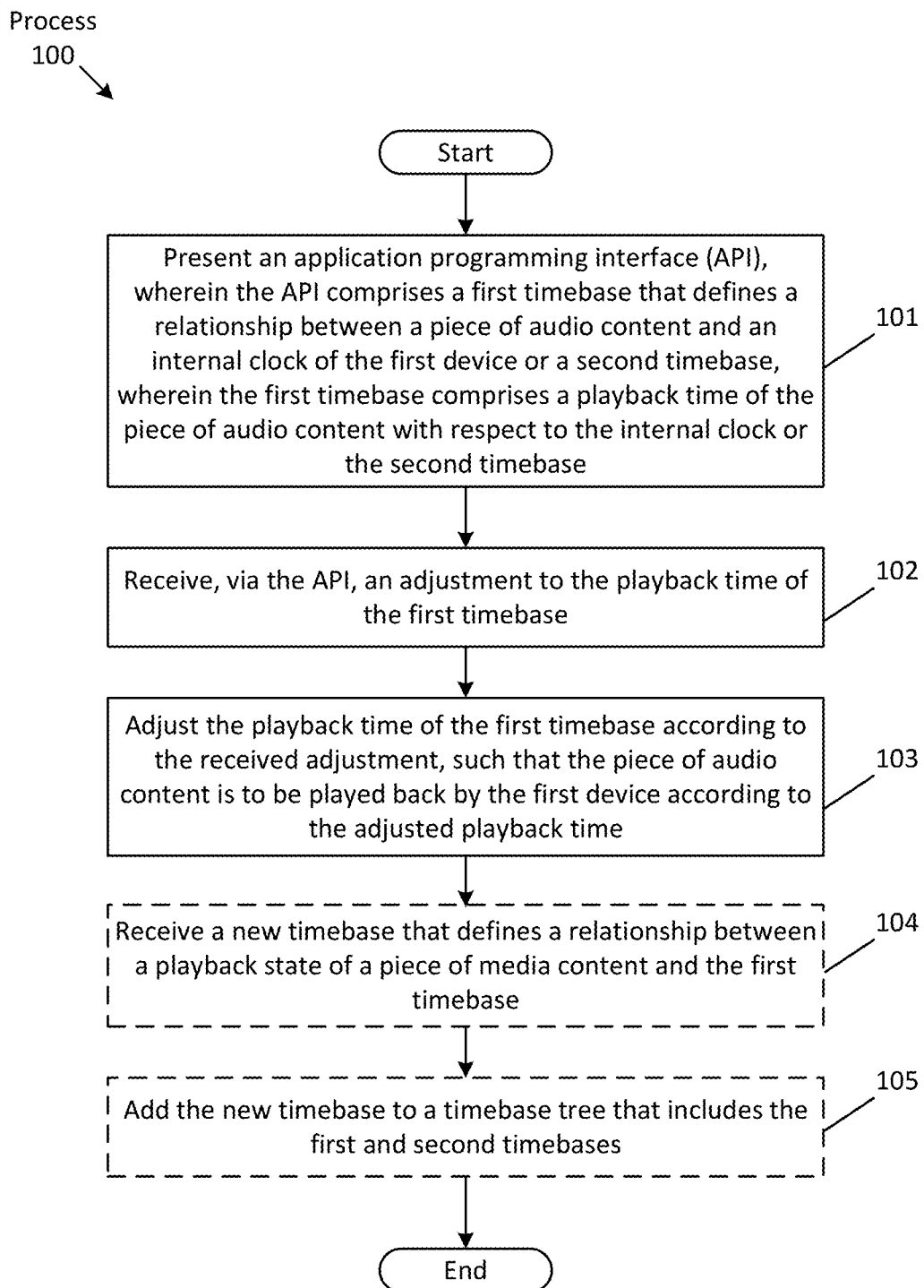
FIG. 10 is a flowchart of one aspect of a process of an Application programming interface (API) performing time-aligned media playback operations.

FIG. 10 is a flowchart of one aspect of a process 100 of an API performing time-aligned media playback operations. Specifically, this process describes at least some of the operations performed by the timebase API 74 for providing a third-party developer created application, such as the second application 72b an interface with one or more other applications (e.g., the first application 72a, the timebase generator 75) in order to time-align media content, which may be associated with the second application (and/or other applications). In particular, this process describes how the API provides an interface for an application to adjust (or modify) and add on to an existing timebase tree.

The process 100 begins by presenting the API (e.g., to the second application), where the API includes a first timebase that defines a relationship between a piece of audio content and an internal clock of the first device or a second timebase, where the first timebase comprises a playback time of the piece of audio content with respect to the internal clock or the second timebase (at block 100). Specifically, the API may receive a function call or message from the second application to retrieve an existing (or generated) timebase tree from memory (e.g., timebase tree 77), where the timebase tree includes one or more timebases, as described herein. In one aspect, the retrieved tree may be a serialized version of the tree, as described herein. In another aspect, the API may return a portion of the tree, or aspects or information (details) of the tree. For instance, the API may return one or more parameters or characteristics of a timebase that defines the timebase's playback time (e.g., $T_{parent}$, R, $T_a$, $T_b$).

Through the API, an adjustment to the playback time of the first timebase is received (at block 102). For instance, the second application may invoke a function call or message that adjusts one or more parameters or characteristics of the timebase. For example, the second application may adjust one of the parameters received from the API. The playback time of the first timebase is adjusted according to the received adjustment, such that the piece of audio content is to be played back by the electronic device according to the adjusted playback time (at block 103). Specifically, the API may interface with the timebase generator 76 to adjust the first timebase of the timebase tree according to the adjustment to the one or more parameters.

The API receives a new timebase that defines a relationship between a playback state of (another) piece of media content land the first timebase (at block 104). For instance, the API may receive one or more parameters that define the relationship between the first timebase and the playback state, such as a rate at which the piece of media content is to be played back, an anchor time of the first timebase, and an anchor time of the new timebase. With the one or more parameters the API may create the new timebase. The API then adds the new timebase to a timebase three that includes the first and second timebases (at block 105).

Some aspects perform variations of the processes 80-100 described in FIGS. 8-10, respectively. For example, the specific operations of at least some of the processes may not be performed in the exact order shown and described. The specific operations may not be performed in one continuous series of operations and different specific operations may be performed in different aspects. For instance, as described herein, the API may be used to adjust a timebase and receive a new timebase to be added to an existing timebase tree. In some aspects, the API may allow an application to create (e.g., a new) timebase tree. In which case, the API 74 may provide an interface with the timebase generator 76 to allow the second application to create the new timebase tree. In another aspect, at least some of the operations described herein may not be performed. For instance, operations within blocks with dashed borders (e.g., blocks 104 and 105) may be optional.

As described thus far, one application (e.g., second application 72b) may interact with another application (e.g., application 72a) via API 74, where the applications are executing on the same device (e.g., device 1). In another aspect, the applications may be executing on different devices. For example, the second application may be executing on another (third) electronic device that is communicatively coupled with the first device. In particular, the application may exchange data via a communication data link (e.g., link 7 illustrated in FIG. 1) that is established between the first device and a third device that is executing the second application. Specifically, the application may establish the communication data link via the timebase API 74, and in which case, the data may be transmitted according to the timebase API 74, which may be designed to communicate and exchange information (data) via the network interface 61 using any suitable network protocol stack including, for example, TCP/IP or UDP/IP at a network layer and HTTPS at an application layer. Thus, at least some of the operations describe herein, may be performed such that data exchanged between the applications is over (or via) a communication data link (e.g., link 7 illustrated in FIG. 1).

In one aspect, when the applications are being executed on different electronic devices, both devices may share at least some characteristics in order to ensure that any timebases that are generated and/or adjusted are aligned between the two devices. For instance, the third device on which the second application is running may share one or more clocks with the first and second devices. Specifically, all of the clocks may share the global clock described herein in order to ensure that timebases that are created by the second application are aligned with the first device's global clock.

Figure 11:
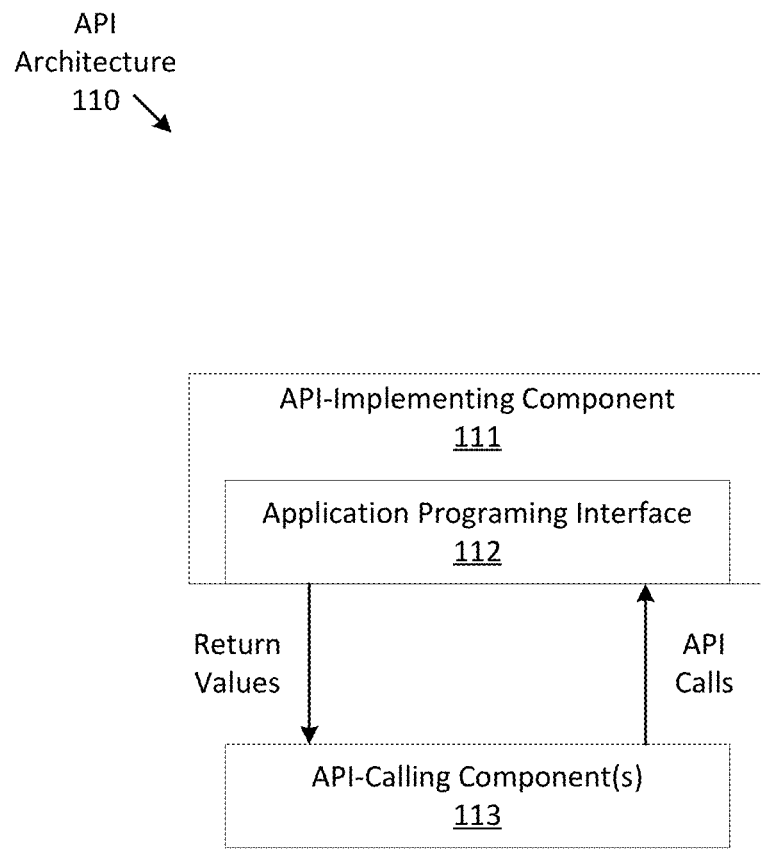
FIG. 11 is a block diagram illustrating an exemplary API architecture, which may be used in some aspects of the invention.

FIG. 11 is a block diagram illustrating an exemplary API architecture, which may be used in some aspects. As shown in FIG. 10, the API architecture 110 includes the API-implementing component 111 (e.g., an operating system, a library, a device driver, an API, an application program, software or other module) that implements the API 112. The API 112 specifies one or more functions, methods, classes, objects, protocols, data structures, formats and/or other features of the API-implementing component that may be used by the API-calling component 113. The API 112 can specify at least one calling convention that specifies how a function in the API-implementing component receives parameters from the API-calling component and how the function returns a result to the API-calling component. The API-calling component 113 (e.g., an operating system, a library, a device driver, an API, an application program, software or other module), makes API calls through the API 112 to access and use the features (e.g., the timebase generator 76, which may be a part) of the API-implementing component 111 that are specified by the API 112. The API-implementing component 111 may return a value (e.g., parameters, data, etc.) through the API 112 to the API-calling component 113 in response to an API call.

It will be appreciated that the API-implementing component 111 may include additional functions, methods, classes, data structures, and/or other features that are not specified through the API 112 and are not available to the API-calling component 113. It should be understood that the API-calling component 113 may be on the same system (or device) as the API-implementing component 111 or may be located remotely and accesses the API-implementing component 111 using the API 112 over a network. For example, this may be the case when an application that is being executed on a separate electronic device (e.g., device 2) accesses data (or requests functions be performed) from another application that is being executed on another device (e.g., device 1). While FIG. 10 illustrates a single API-calling component 113 interacting with the API 112, it should be understood that other API-calling components, which may be written in different languages (or the same language) than the API-calling component 113, may use the API 112.

In one aspect, the API-implementing component 111, the API 112, and the API-calling component 113 may be a part of API 73 that are stored in a machine-readable medium 70, which includes any mechanism for storing information in a form readable by a machine (e.g., a computer or other data processing system). For example, a machine-readable medium includes magnetic disks, optical disks, random access memory; read only memory, flash memory devices, etc.

An aspect of the disclosure is a method performed by a first device of a system that aligns audio playback between one or more other devices. The system may include the first device (e.g., a head-worn device) that is participating in an extended reality (XR) environment with a second device. The first device may transmit a signal to the second device to share a clock (e.g., an internal clock). The first device presents the XR environment and plays back audio content, where the XR environment is also presented and the audio content is also played back on the second device (or one or more other devices). Specifically, users of both devices may be participants within the XR environment. For example, the playback of the audio content may be the result of user interaction of the first user of the first device (e.g., the first user ringing a virtual bell in the XR environment). The first device generates timebase information that is arranged to define timing relationships between playback states of audio content. Specifically, the generated information includes (e.g., as timing data) a first timebase that defines a relationship between the shared clock and the internal clock of the first device and a second timebase that defines a relationship between the first timebase and a playback state of the audio content. For instance, the playback state may be to initiate playback of the audio content and the second timebase may indicate that the audio content is to be played back at a playback time after a current time of the first timebase and at a particular playback rate. The first device may transmit the timebase information to the second device that synchronizes the playback state of the audio content in the second device with the playback state of the audio content in the first device (e.g., according to the relationships defined by the timebases).

In one aspect, the shared clock is based on a distance between both devices. Specifically, the first device determines whether the second device is located within a threshold distance of the first device, where, in response to the second device being located within the threshold distance, transmitting the signal to the second device to share the clock includes transmitting clock synchronization messages using IEEE 802.1AS protocol. If, however, both devices are far apart (e.g., the second device being located outside the threshold distance) the first device signals the second device to set a clock using time information obtained from a Network Time Protocol (NTP) server. Thus, both devices may share clocks via IEEE 802.1AS protocol or both devices may use timing information from a NTP server, based on their locations.

Another aspect of the disclosure is a method performed by the device (e.g., second device), which receives the generated timebase information in order to synchronize playback with the first device. Specifically, the device receives the signal from the first device to share the clock. The device receives a serialized description of the timebase information that includes the timebases. The device reconstructs the timebase information by deserializing the serialized description, and uses the reconstructed timebase information to playback the audio content in synchronization with the other device.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
receiving, from a first application that is being executed on a first electronic device, timebase information that includes a first timebase that defines a relationship between a playback state of audio content of the first application and an internal clock of the first electronic device or another timebase;
receiving metadata that indicates a logical function that is to be performed by a second application;
generating, based on the metadata, a second timebase that defines a relationship between the first timebase and a performance of the logical function by the second application; and
providing the second timebase to the first application.

2. The method of claim 1, wherein the performance of the logical function comprises displaying an image or animation, wherein the second timebase is configured to synchronize the playback state of the audio content with the displaying of the image or animation.

3. The method of claim 1, wherein the metadata is associated with the second application that is configured to perform the logical function, wherein the second timebase is provided, by the second application, to the first application that is being executed on the first electronic device via an application programming interface (API).

4. The method of claim 3, wherein providing the second timebase comprises:
establishing, by the second application that is being executed on a second electronic device, a communication data link via the API; and
transmitting, over the communication data link, the second timebase to the first electronic device.

5. The method of claim 1, wherein the method is performed by the second application that is a third-party application with respect to the first application that is being executed by the first electronic device.

6. The method of claim 1, wherein the second timebase synchronizes the playback state of the audio content with the performance of the logical function on the first electronic device and a second electronic device, wherein the method further comprises:
after providing the second timebase, adjusting the relationship between the first timebase and the performance of the logical function; and
providing the second timebase with the adjusted relationship to the first application to resynchronize the playback state of the audio content with the performance of the logical function on the first and second electronic devices.

7. The method of claim 1 further comprising determining an alignment to perform the logical function with respect to the playback state of the audio content to synchronize the performance of the logical function with the audio content during playback by the first electronic device and a second electronic device, wherein the second timebase is generated based on the determined alignment.

8. A first electronic device, comprising:
at least one processor; and
memory that has instructions which when executed by the at least one processor causes the first electronic device to:
receive, from a first application that is being executed on the first electronic device, timebase information that includes a first timebase that defines a relationship between a playback state of audio content of the first application and an internal clock of the first electronic device or another timebase;
receive metadata that indicates a logical function that is to be performed by a second application;
generate, based on the metadata, a second timebase that defines a relationship between the first timebase and a performance of the logical function by the second application; and
provide the second timebase to the first application.

9. The first electronic device of claim 8, wherein the performance of the logical function comprises displaying an image or animation, wherein the second timebase is configured to synchronize the playback state of the audio content with the displaying of the image or animation.

10. The first electronic device of claim 8, wherein the metadata is associated with the second application that is configured to perform the logical function, wherein the second timebase is provided, by the second application, to the first application that is being executed on the first electronic device via an application programming interface (API).

11. The first electronic device of claim 10, wherein the second timebase is provided by:
establishing a communication data link via the API; and
transmitting, over the communication data link, the second timebase to the first electronic device.

12. The first electronic device of claim 8, wherein operations of receiving the timebase information, receiving the metadata, generating the second timebase, and providing the second timebase are performed by the second application that is a third-party application with respect to the first application that is being executed by the first electronic device.

13. The first electronic device of claim 8, wherein the second timebase synchronizes the playback state of the audio content with the performance of the logical function on the first electronic device and a second electronic device, wherein the memory comprises further instructions to:
after providing the second timebase, adjust the relationship between the first timebase and the performance of the logical function; and
provide the second timebase with the adjusted relationship to the first application to resynchronize the playback state of the audio content with the performance of the logical function on the first and second electronic devices.

14. The first electronic device of claim 8, wherein the memory comprises further instructions to determine an alignment to perform the logical function with respect to the playback state of the audio content to synchronize the performance of the logical function with the audio content during playback by the first electronic device and a second electronic device, wherein the second timebase is generated based on the determined alignment.

15. A non-transitory machine-readable storage medium comprising instructions stored therein that configure an electronic device to:
receive, from a first application that is being executed on a first electronic device, timebase information that includes a first timebase that defines a relationship between a playback state of audio content of the first application and an internal clock of the first electronic device or another timebase;
receive metadata that indicates a logical function that is to be performed by a second application;

generate, based on the metadata, a second timebase that defines a relationship between the first timebase and a performance of the logical function by the second application; and provide the second timebase to the first application.

16. The non-transitory machine-readable storage medium of claim 15, wherein the performance of the logical function comprises displaying an image or animation, wherein the second timebase is configured to synchronize the playback state of the audio content with the displaying of the image or animation.

17. The non-transitory machine-readable storage medium of claim 15, wherein the metadata is associated with the second application that is configured to perform the logical function, wherein the second timebase is provided, by the second application, to the first application that is being executed on the first electronic device via an application programming interface (API).

18. The non-transitory machine-readable storage medium of claim 17, wherein providing the second timebase comprises:

establishing, by the second application that is being executed on a second electronic device, a communication data link via the API; and transmitting, over the communication data link, the second timebase to the first electronic device.

19. The non-transitory machine-readable storage medium of claim 15, wherein the second timebase synchronizes the playback state of the audio content with the performance of the logical function on the first electronic device and a second electronic device, wherein the non-transitory machine-readable storage medium comprises further instructions to:

after providing the second timebase, adjust the relationship between the first timebase and the performance of the logical function; and provide the second timebase with the adjusted relationship to the application to resynchronize the playback state of the audio content with the performance of the logical function on the first and second electronic devices.

20. The non-transitory machine-readable storage medium of claim 15 comprises further instructions to determine an alignment to perform the logical function with respect to the playback state of the audio content to synchronize the performance of the logical function with the audio content during playback by the first electronic device and a second electronic device, wherein the second timebase is generated based on the determined alignment.

* * * * *